(12) United States Patent
Saha et al.

(10) Patent No.: US 9,916,092 B2
(45) Date of Patent: Mar. 13, 2018

(54) METHODS AND SYSTEMS TO ALLOCATE PHYSICAL DATA-STORAGE COSTS TO LOGICAL DISKS

(71) Applicant: VMWARE, INC., Palo Alto, CA (US)

(72) Inventors: Mrityunjoy Saha, Bangalore (IN); Hemanth Kumar Pannem, Bangalore (IN); Swarnalatha Pasupuleti, Bangalore (IN); Kumar Gaurav, Bangalore (IN); Shrisha Chandrashekar, Bangalore (IN); Gurusreekanth C, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 80 days.

(21) Appl. No.: 15/062,235

(22) Filed: Mar. 7, 2016

(65) Prior Publication Data
US 2017/0168714 A1 Jun. 15, 2017

(30) Foreign Application Priority Data

Dec. 9, 2015 (IN) .......................... 6600/CHE/2015

(51) Int. Cl.
*G06F 12/00* (2006.01)
*G06F 3/06* (2006.01)

(52) U.S. Cl.
CPC ............ *G06F 3/0604* (2013.01); *G06F 3/067* (2013.01); *G06F 3/0631* (2013.01); *G06F 3/0653* (2013.01)

(58) Field of Classification Search
None
See application file for complete search history.

(56) References Cited

U.S. PATENT DOCUMENTS

2006/0271815 A1* 11/2006 Mizuno ............... G06F 11/2071
714/6.12
2015/0186192 A1* 7/2015 Dyakin .................... G06F 9/54
719/313

* cited by examiner

*Primary Examiner* — John A Lane
(74) *Attorney, Agent, or Firm* — Thomas Horstemeyer, LLP

(57) ABSTRACT

Methods and systems are directed to allocating costs of storage arrays to logical disks. A fully loaded cost of storage of a storage area network ("SAN") is calculated based on capital and operational expenditures of the SAN. Data is stored in the SAN in logical groups partitioned into logical disks. The unit rates of the logical groups are calculated from the capacities and utilization of the storage arrays that form the SAN. The unit rate of a logical disk is the unit rate the logical group to which the logical disk belongs. The storage cost of each logical disk is calculated from the unit rate of the logical disk and the utilized capacity of the logical disk. Methods also calculate cost of unallocated capacities of the logical disks, storage arrays, and the SAN, in order to evaluate efficient use of the SAN storage resources.

21 Claims, 24 Drawing Sheets

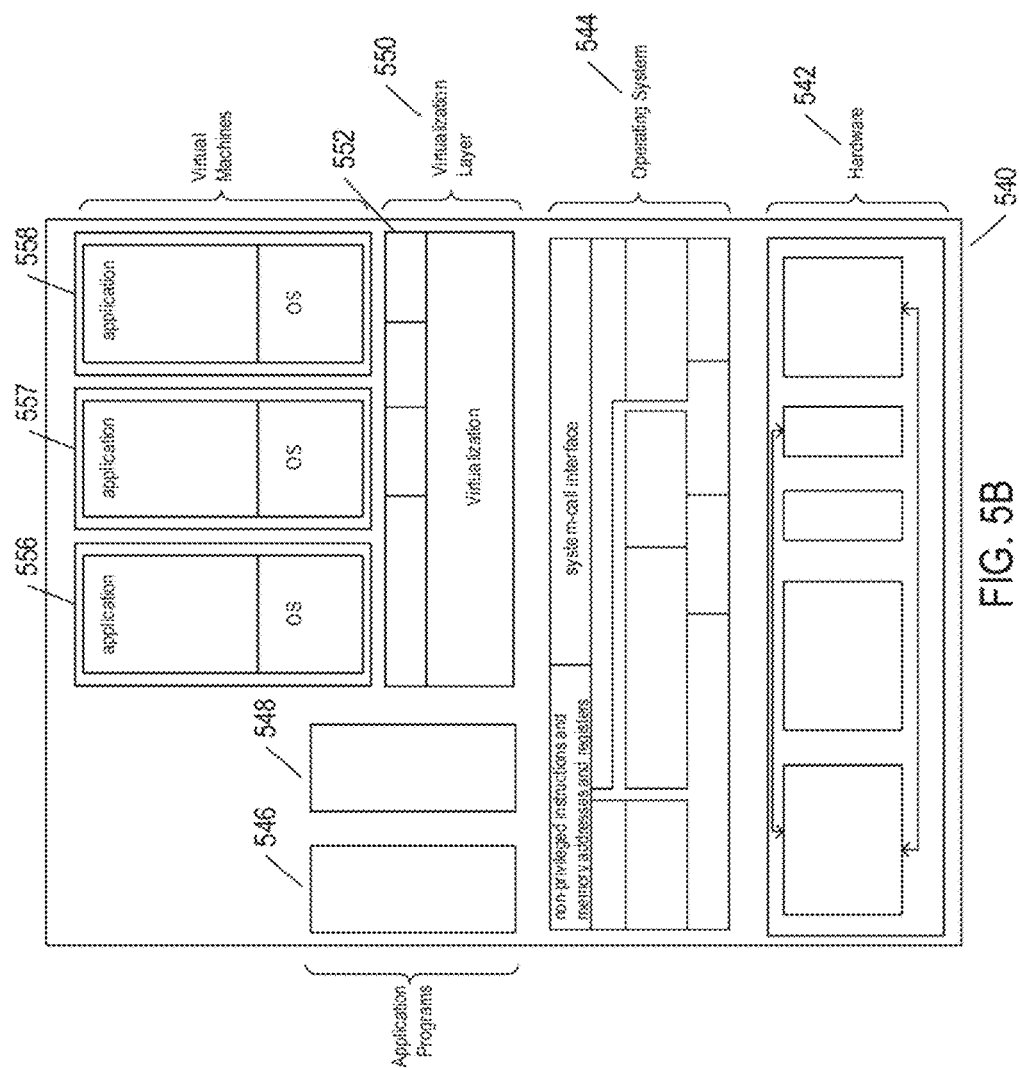

| Component | Count | Vendor | Configuration | Reference cost | Cost |
|---|---|---|---|---|---|
| Disk | 10 | V1 | 500GB, SAS, 7.5Krpm | $50 | $500 |
| Disk | 20 | V2 | 1 TB, SSD | $250 | $5000 |
| Disk array enclosure | 5 | V3 | 20 slots, 3.5 inch | $100 | $500 |
| Storage processor | 1 | V4 | 2x 4-Core 2.2 GHz | $30,000 | $30,000 |
| | | | Total | | $36,000 |

| Component | Vendor | Count | Configuration | Reference cost ($) |
|---|---|---|---|---|
| Unisphere | EMC | 1 | | 23,891.30 |
| Storage Processor Enclosure | EMC | 1 | | 448.69 |
| Storage Processors | EMC | 2 | | 52,299.38 |
| Disk Enclosure | EMC | 3 | 60 drives | 34,761.39 |
| SAS, HDD | Hitachi | 268 | 821 GB | 511,092.10 |
| Flash memory | Samsung | 20 | 183 GB | 13,100.60 |
| Flash memory | Sata-mic | 31 | 367 GB | 40,723.15 |
| SAS, HDD | Seagate | 4 | 268 GB | 2,490.08 |
| SAS, HDD | Seagate | 155 | 821 GB | 29,5594.30 |
| Flash memory | Hitachi | 1 | 183 GB | 655.03 |
| Total Storage Hardware Cost ($C_{SH}$) | | | | 975,056.00 |

FIG. 22

| Line item | Formula | Cost | Equation No. |
|---|---|---|---|
| Monthly storage hardware cost $MC_{SH}$ | Applied double dep. for 5 years assuming purchased in current year of $C_{SH}$ | 32,502 | Eq. (3) |
| Monthly storage Network cost $MC_{SN}$ | Assumed | 5,000 | Eq. (4) |
| Monthly captical expenditure $MC_{Capex}$ | $MC_{SH} + MC_{SN}$ | 37,502 | Eq. (5) |
| Monthly operational expenditure $C_{Opex}$ | Assumed | 5,000 | Eq. (6) |
| Fully loaded monthly cost of storage $C_S$ | $MC_{Capex} + C_{Opex}$ | 42,502 | Eq. (7) |

FIG. 23

| Line Item | Formula | Cost($) or Unit Rate($/GB) | Equation No. |
|---|---|---|---|
| Total SAS disk capacity $Cap_{SAS}$ | Taken from above table where total storage hardware cost is determined | 348,355GB | |
| Total SAS disk cost $TC_{SAS}$ | | 809,176 | Eq. (8) |
| Total flash capacity $Cap_{Flash}$ | | 15,220GB | |
| Total flash disk cost $TC_{Flash}$ | | 54,478 | Eq. (8) |
| Total storage cost $TC_{Storage}$ | $TC_{Storage} = TC_{SAS} + TC_{Flash}$ | 809,176 + 54,478 = 863,654 | Eq. (9) |
| Cost ratio for SAS $Ratio_{SAS}$ | $TC_{SAS}/TC_{Storage}$ | 809,176 / 863,654 = 0.937 | Eq. (10) |
| Cost ratio for flash $Ratio_{Flash}$ | $TC_{Flash}/TC_{Storage}$ | 54,478 ÷ 863,654 = 0.063 | Eq. (10) |
| Fully loaded cost of SAS $C_{SAS}$ | $C_S \times Ratio_{SAS}$ | 42,502 × 0.937 = 39,824 | Eq. (11) |
| Fully loaded cost of flash $C_{Flash}$ | $C_S \times Ratio_{Flash}$ | 42,502 ÷ 0.063 = 2,687 | Eq. (11) |
| SAS unit rate $U_{SAS}$ | $C_{SAS}/UCap_{SAS}$ | 39,824 / 348,355 = $0.114/GB | Eq. (13) |
| Flash unit rate $U_{Flash}$ | $C_{Flash}/UCap_{Flash}$ | 2,768 / 15,220 = $0.176GB | Eq. (13) |
| Cost of storage pool $C_{LG}$ | $\sum_{StorageType} \left( U_{StorageType} \times LGCap_{StorageType} \right)$ | (0.114 × 340,000 + 0.176 × 15,000) = 41,400 | Eq. (15) |
| Usable capacity of storage pool $UCap_{LG}$ | Assumed | 270,000 GB | |
| Unit rate of storage pool $U_{LG}$ | $C_{LG}/UCap_{LG}$ | 41,400 / 270,000 = $0.153/GB | Eq. (14) |
| Unit rate of logical disk $U_{LD}$ | $U_{LD} = U_{LG}$ | $0.153GB | Eq. (17) |
| Capacity of logical disk $Cap_{LD}$ | Assumed | 100,000GB | |
| Cost of logical disk $C_{LD}$ | $U_{LD} \times Cap_{LD}$ | 0.153 × 100,000 = $15,300 | Eq. (18) |

FIG. 24

| Line item | Formula | Cost($) or Unit Rate($/GB) | Equation No. |
|---|---|---|---|
| Logical disk usable capacity $UCap_{LD}$ | Assumed | 100,000 GB | |
| Logical disk used capacity $CCap_{LD}$ | Assumed | 50,000 GB | |
| Unallocated cost of logical disk | $(UCap_{LD} - CCap_{LD}) \times U_{LD}$ | $(100,000 - 50,000) \times 0.153 = \$7,650$ | Eq. (19) |
| Unallocated cost of storage pool $UC_{LG}$ | | $\$7,650 + (270,000 - 100,000) \times 0.153 = \$33,660$ | Eq. (20) |
| Unallocated cost of storage array $UC_{SA}$ | | $\$33,660 + ((348,355 - 340,000) \times 0.114 + (15,220 - 15,500) \times 0.176) = \$34,651$ | Eq. (22) |
| Unallocated storage cost of datacenter $UC_{Datacenter}$ | $\sum_{SA \in DataCenter} UC_{SA}$ | $\$34,651$ | Eq. (24) |

FIG. 25

METHODS AND SYSTEMS TO ALLOCATE PHYSICAL DATA-STORAGE COSTS TO LOGICAL DISKS

RELATED APPLICATIONS

Benefit is claimed under 35 U.S.C. 119(a)-(d) to Foreign application Ser. No. 6600/CHE/2015 filed in India entitled "METHODS AND SYSTEMS TO ALLOCATE PHYSICAL DATA-STORAGE COSTS TO LOGICAL DISKS", filed on Dec. 9, 2015, by VMware, Inc., which is herein incorporated in its entirety by reference for all purposes.

TECHNICAL FIELD

Methods and systems are directed to allocating physical data-storage costs to logical disks.

BACKGROUND

In recent years, enterprises have shifted much of their computing needs from enterprise owned and operated computer systems to cloud computing providers. Cloud computing providers charge enterprises to store and run their applications in a cloud-computing facility and allow enterprises to purchase other computing services in much the same way utility customers purchase a service from a public utility. A typical cloud-computing facility is composed of numerous racks of servers, switches, routers, and mass data-storage devices interconnected by local-area networks, wide-area networks, and wireless communications that may be consolidated into a single data center or distributed geographically over a number of data centers. Enterprises typically run their applications in a cloud-computing facility as virtual machines ("VMs") that are consolidated into a virtual data center ("VDC") also called a software defined data center ("SDDC"). A VDC recreates the architecture and functionality of a physical data center for running an enterprise's applications.

VDCs store data in storage arrays. Although a typical storage array consists of storage processors, processor enclosures, arrays of tens to hundreds of drives and drive enclosures, depending on the vendor offering storage, the architecture and components of the storage arrays varies widely. The network infrastructure connecting the storage arrays is typically composed of fiber cable, fiber cable over Ethernet, or plain Ethernet and corresponding adapters depending on performance requirements. Storage arrays are typically divided into two categories—Storage Area Network ("SAN") and Network Attached Storage ("NAS"). The difference between a SAN and a NAS is that a SAN is composed of a network of storage arrays, while a NAS is a storage device connected to a network. End users don't save files directly to SANs. Instead, SANs store blocks of data in a network of physical data-storage devices (e.g., tape drives, solid state drives and hard disk drives) for access by the applications running on servers. In contrast, end users can save files directly to a NAS. The hardware architecture, array components and the way storage units are made available by storage systems and consumed by VMs and physical servers are different for the SAN and NAS. For example, a SAN provides logical disks ("LDs") and NAS provides shared volumes to host systems. An LD is a virtual data-storage device that provides an area of usable storage capacity on one or more physical data-storage devices.

However, monitoring all aspects of storage costs for a VDC and fairly allocating this cost to LDs is often challenging for IT managers for the following reasons: 1) It is often challenging to keep track of all storage arrays and their individual components that are used for data storage. 2) Calculation of total cost of ownership of storage is often complicated by the various drive types (e.g. solid state drive and hard disk drives) and component specification (e.g. disk array with 15 slots). 3) Fair allocation of the total storage cost to LDs may be further complicated when the LDs are exposed to external hosts and identify unallocated cost or wastage of storage. In addition, depending on the physical data-storage array architecture, the number of layers between the physical data-storage devices and LDs varies to a great extent. IT managers seek methods and systems to calculate storage costs of logical disks that take into consideration all aspects that attribute to storage expense in a physical data center.

SUMMARY

Methods and systems are directed to allocating costs of storage arrays to logical disks. The storage arrays form the physical data storage of a storage area network ("SAN"). Methods calculate a fully loaded cost of storage of the SAN based on capital and operational expenditures of the SAN. Data is stored in the SAN in logical groups that are partitioned into logical disks. Methods determine storage capacities and utilization of the storage arrays that are used to form the logical groups. The unit rates of the logical groups are calculated from the capacities and utilization of the storage arrays. Because the logical disks are formed from the logical groups, the unit rate of a logical disk is the unit rate the logical group to which the logical disk belongs. The storage cost of each logical disk is calculated from the unit rate of the logical disk and the utilized capacity of the logical disk. Methods also calculate unallocated costs of storage in the SAN, so that the efficient use of the SAN can be evaluated.

DESCRIPTION OF THE DRAWINGS

FIG. 14 shows an example of a storage hardware reference database of compute and storage hardware components of a storage area network ("SAN").

FIG. 22 shows a table of components, configuration, and reference costs of a VNX 8000 storage array.

FIG. 23 shows a table hardware and network component costs, capital and operational expenditures, and fully loaded monthly cost of storage for a physical data center that house the VNX 8000.

FIG. 24 shows a table capacities, costs, and unit rates calculated for the VNX 8000 storage array based on the data in the tables of FIGS. 21 and 22.

FIG. 25 shows a table unallocated cost of storage for the VNX 8000.

DETAILED DESCRIPTION

Figure 1:
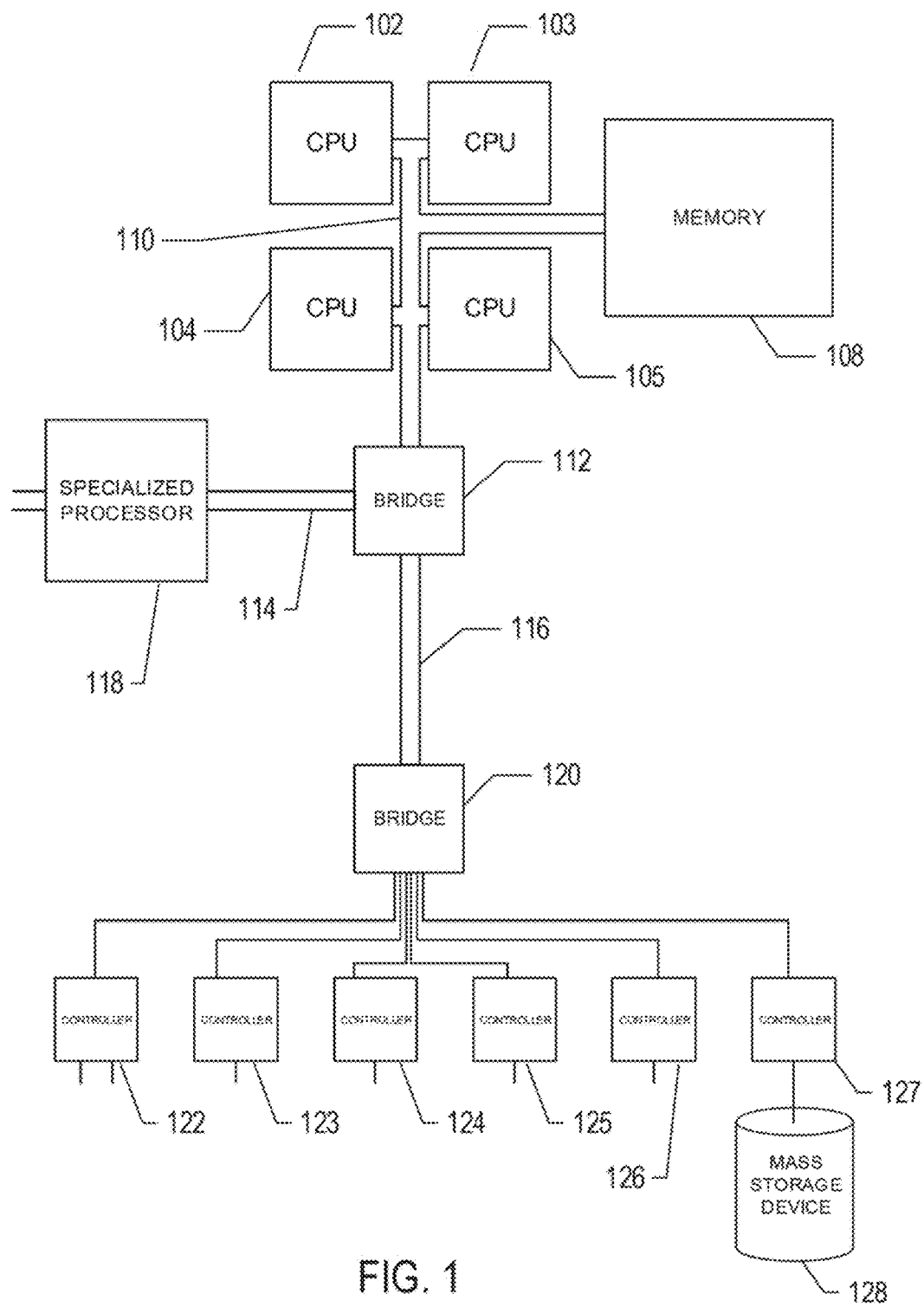
FIG. 1 shows a general architectural diagram for various types of computers.

This disclosure presents computational methods and systems to allocate cost of physical data-storage devices to logical disks in a virtual data center. Computer hardware, complex computational systems, and virtualization are described in a first subsection. Methods and systems to allocate cost of physical data-storage costs to logical disks in a virtual data center are described in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and VMs, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
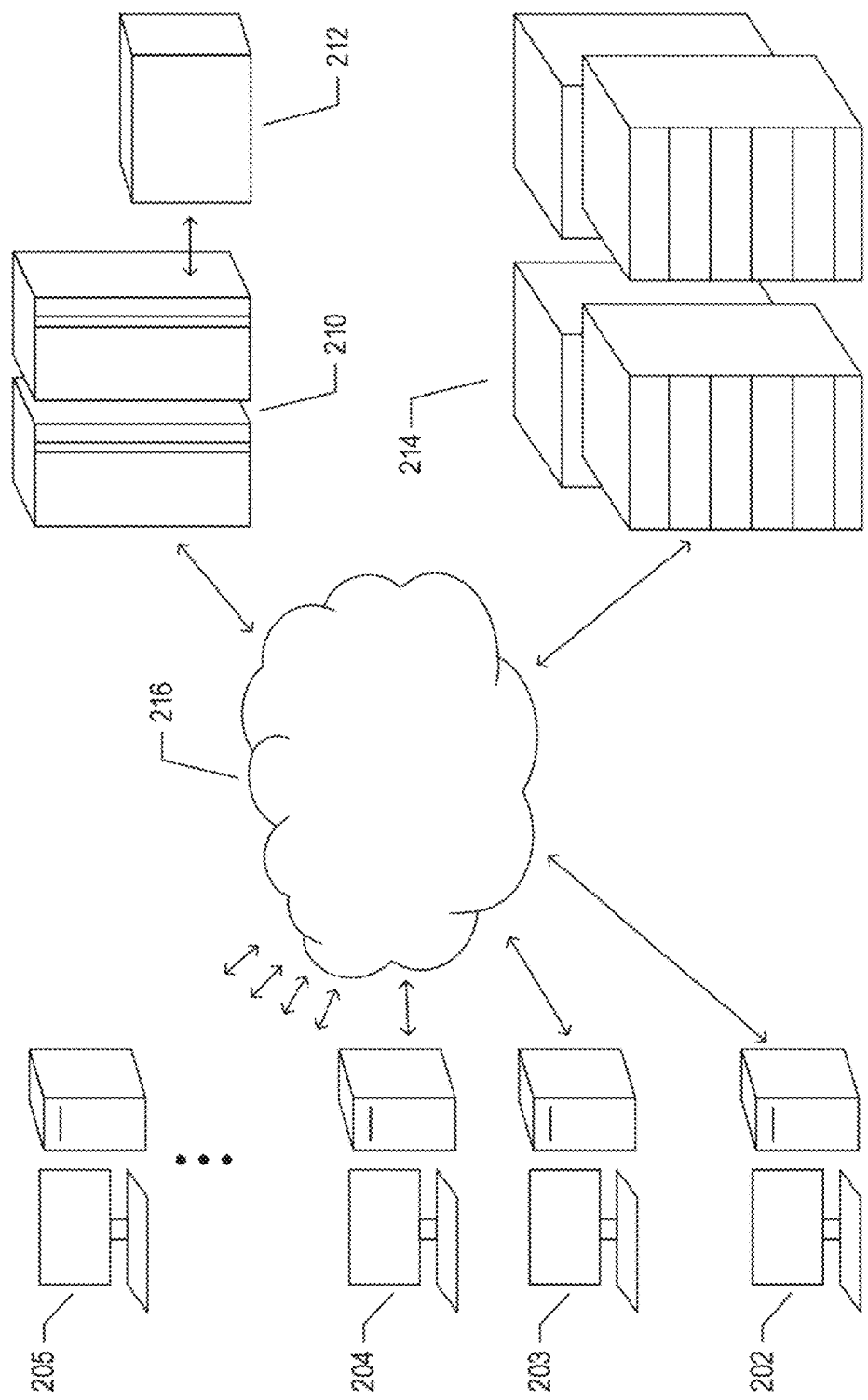
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
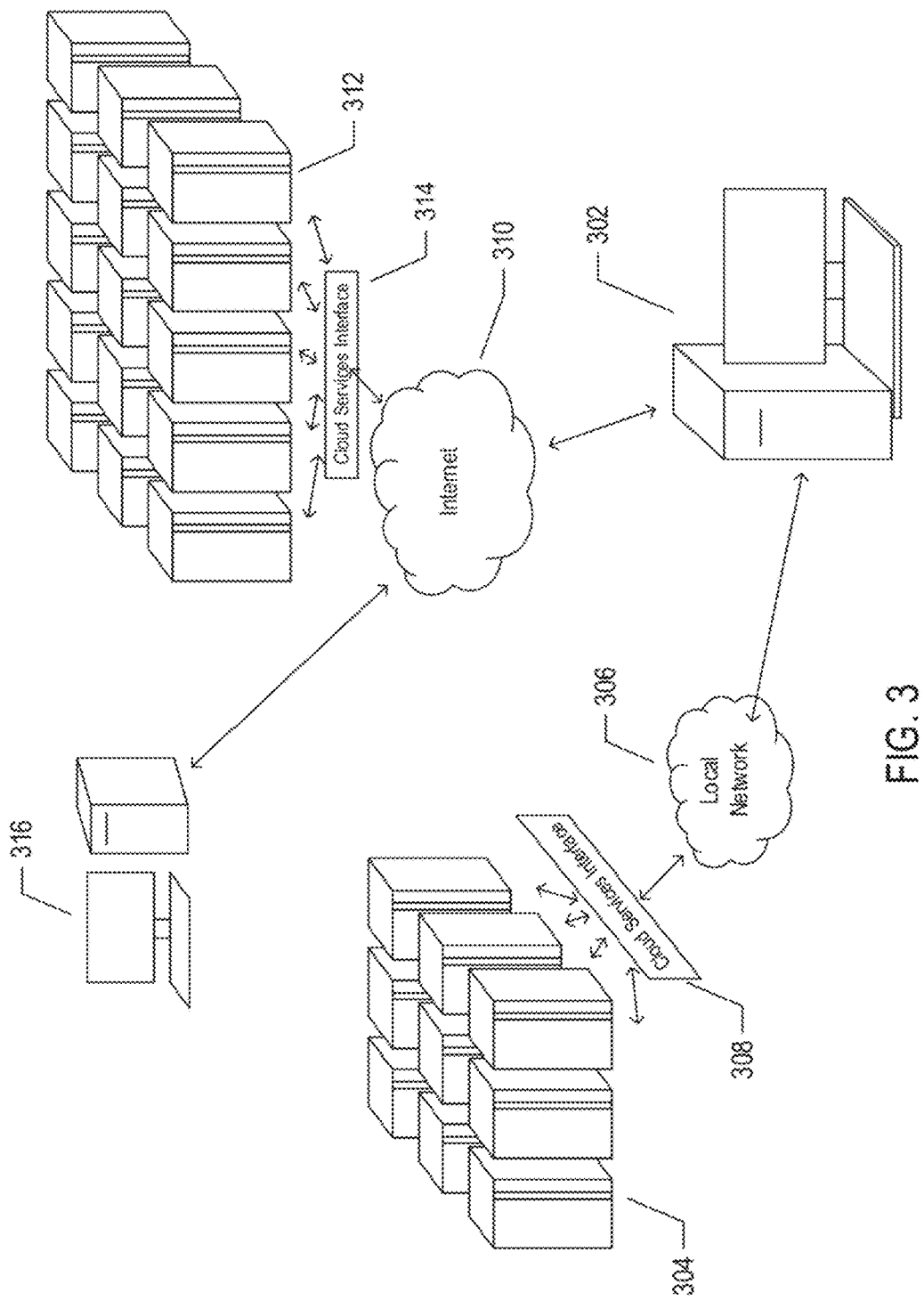
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
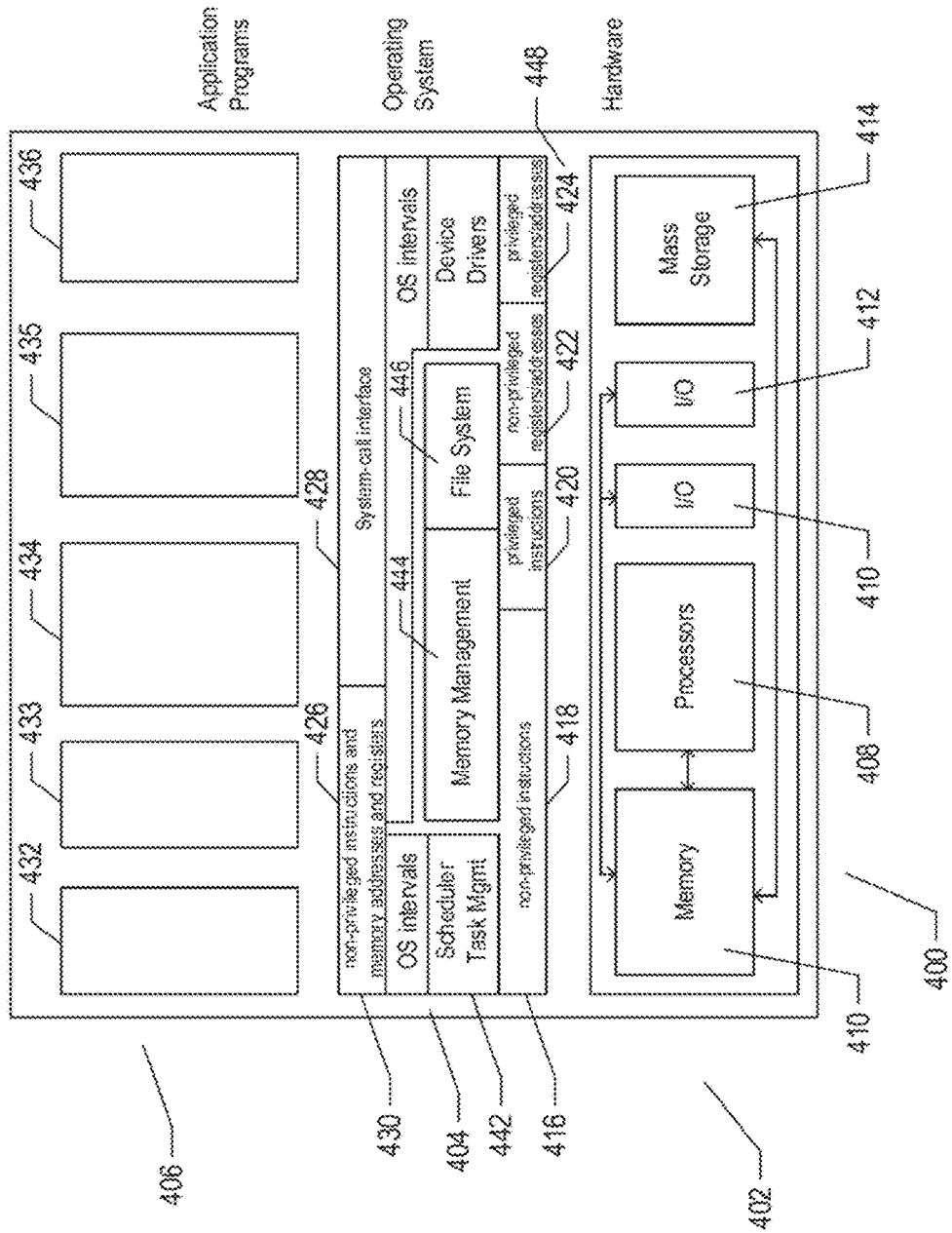
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
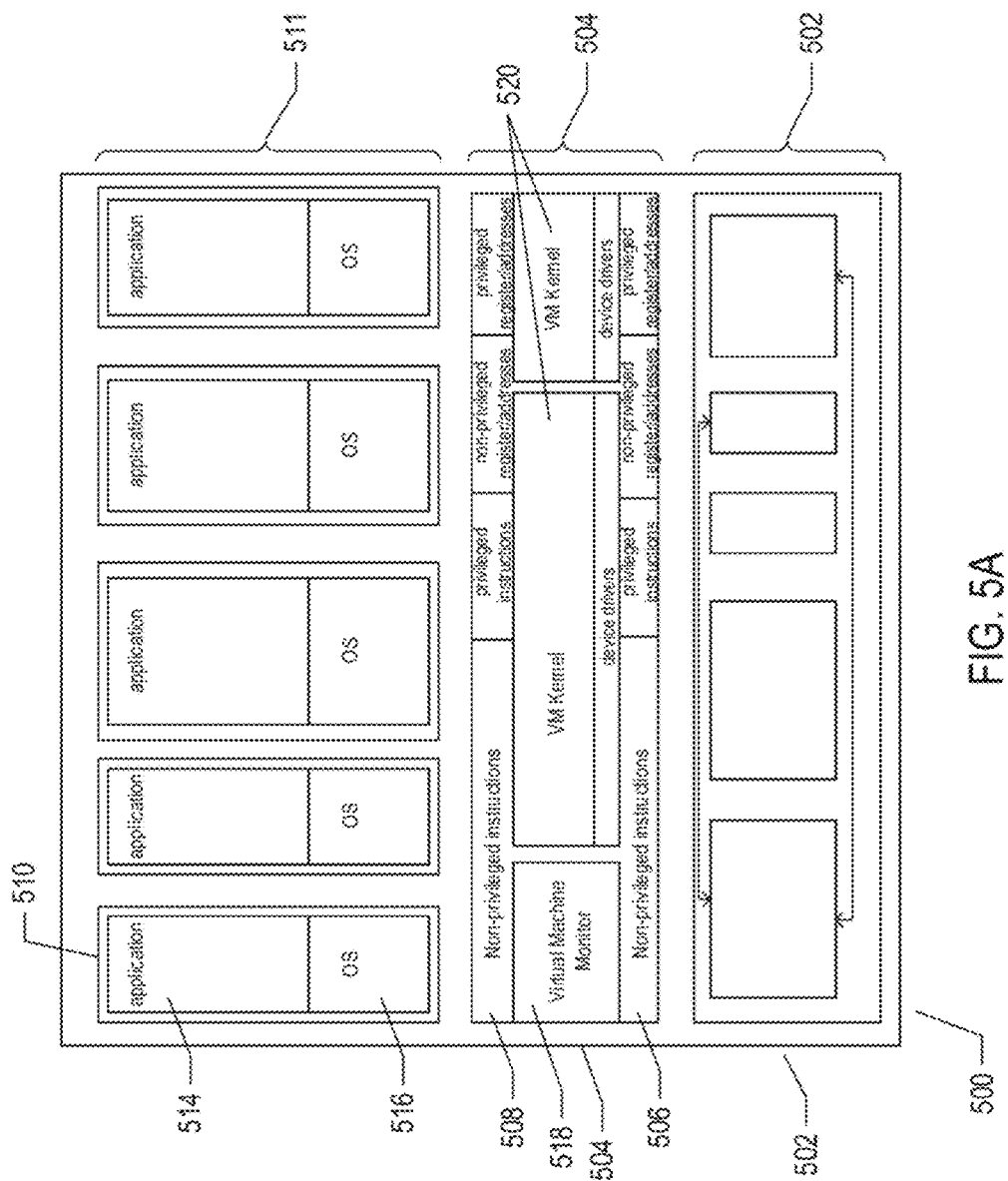
FIGS. 5A-SB show two types of virtual machine and virtual-machine execution environments.

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface 508 to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization-layer interface 508 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization-layer interface 508 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 508, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
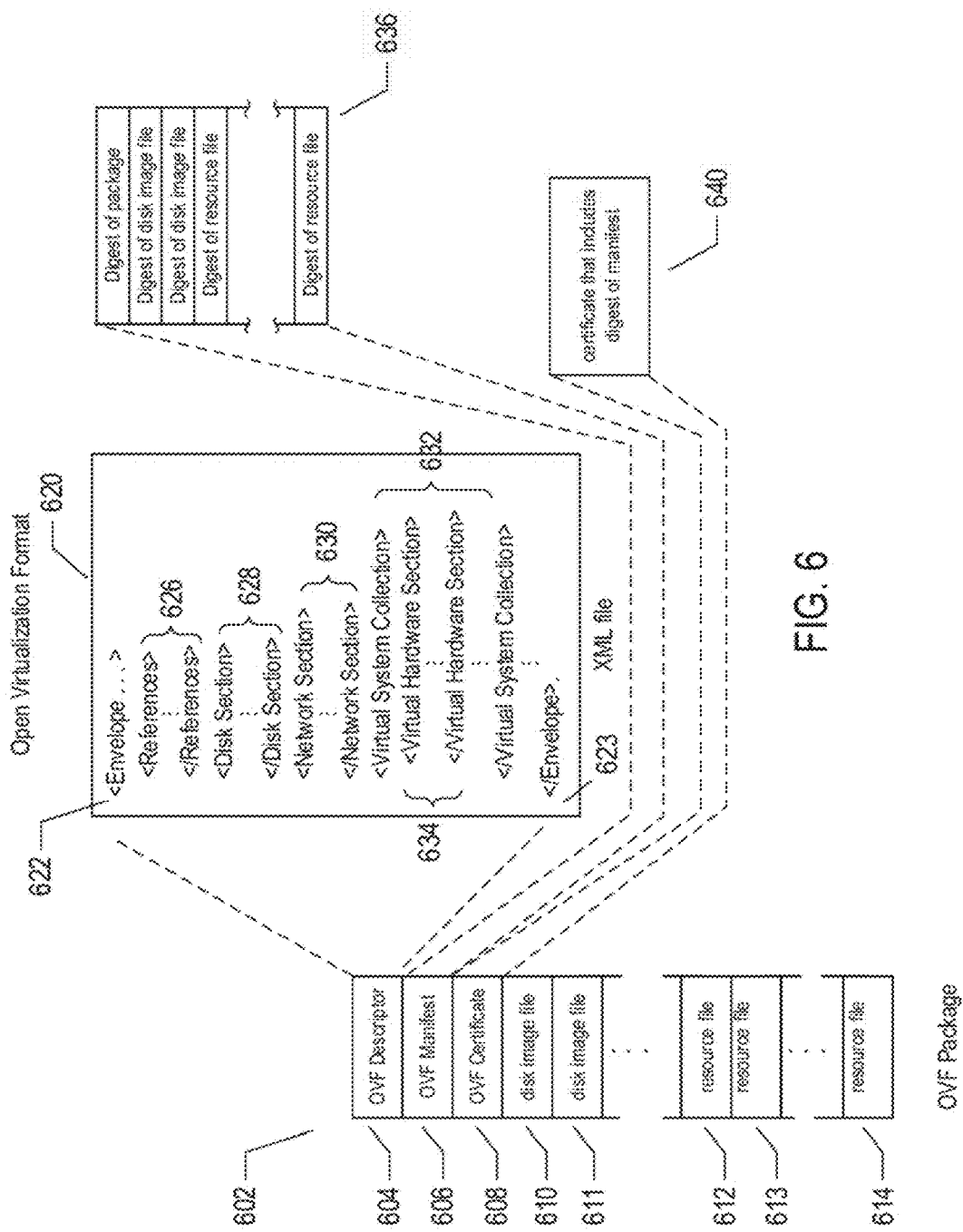
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the logical disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of logical disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
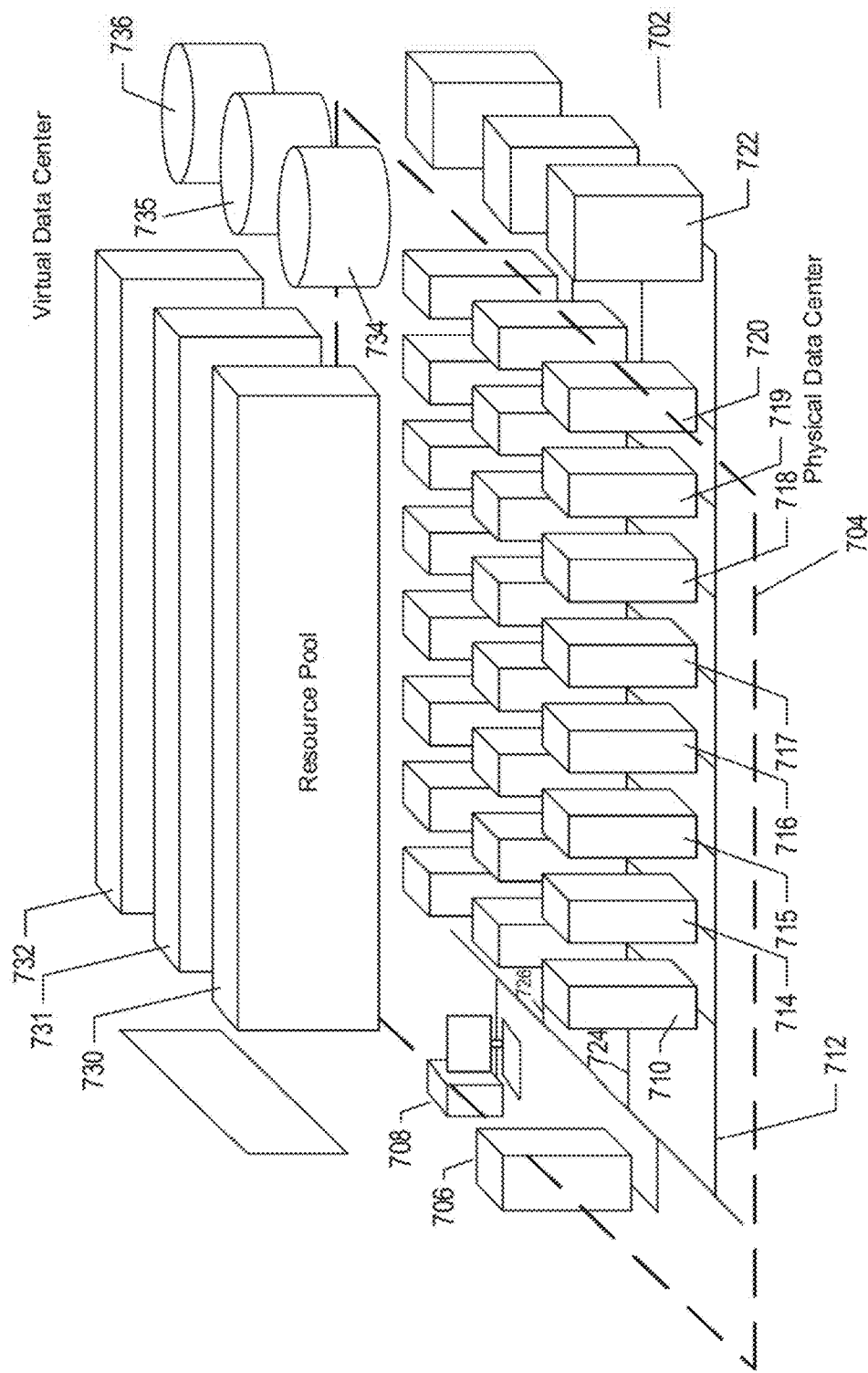
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
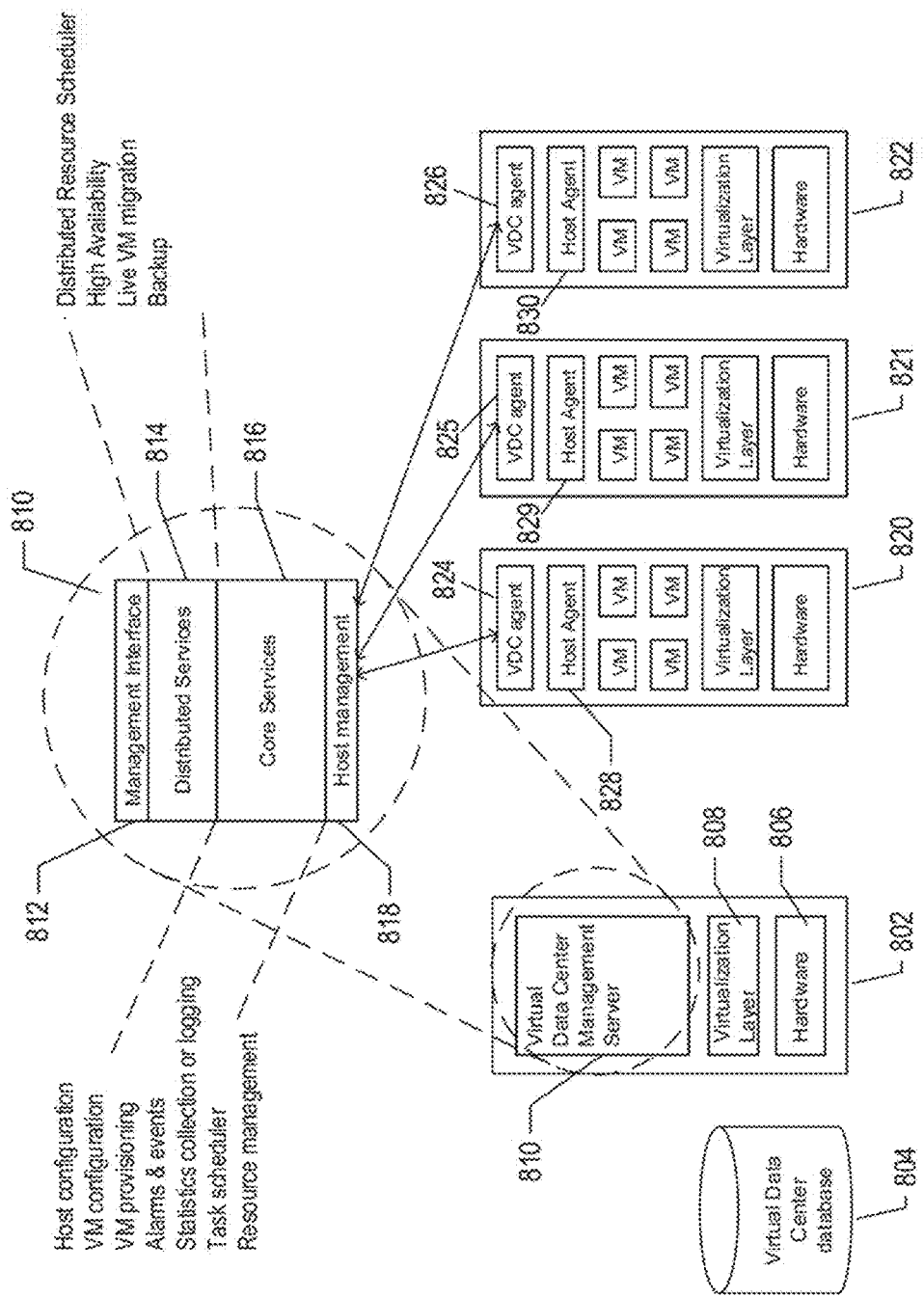
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The VM 810 includes a management-interface component 812, distributed services 814, core services 816, and a host-management interface 818. The management interface 818 is accessed from any of various computers, such as the PC 708 shown in FIG. 7. The management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
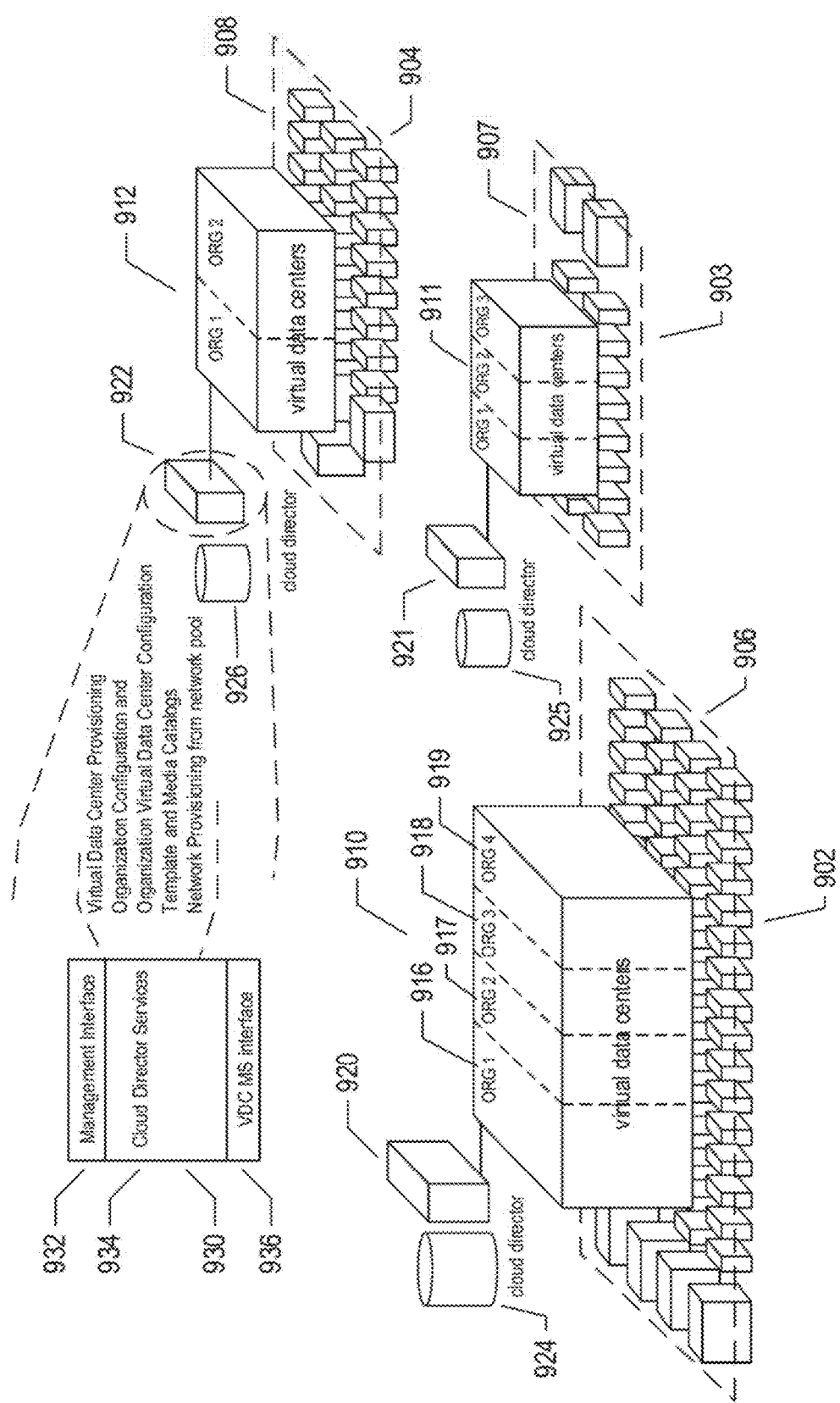
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
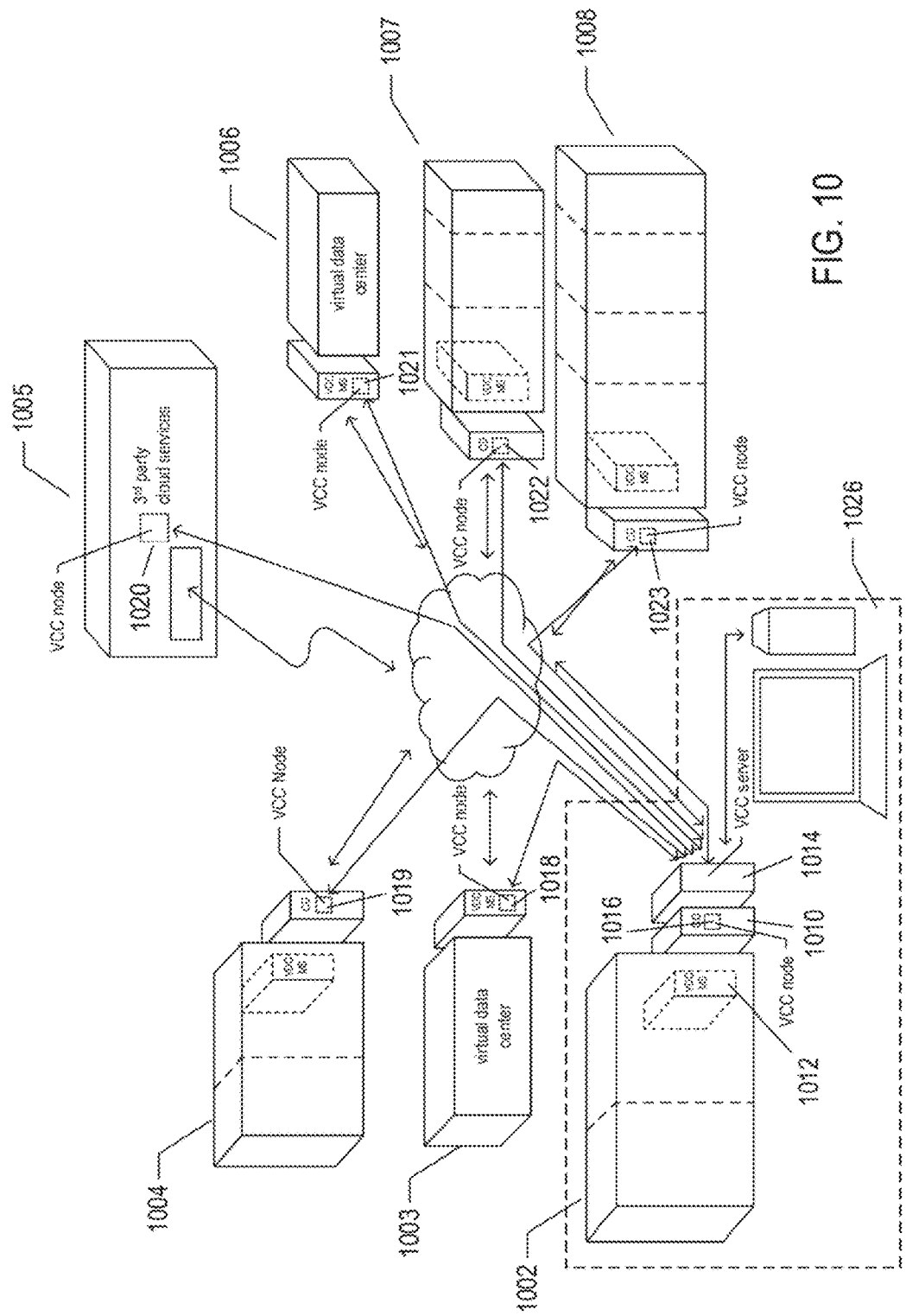
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
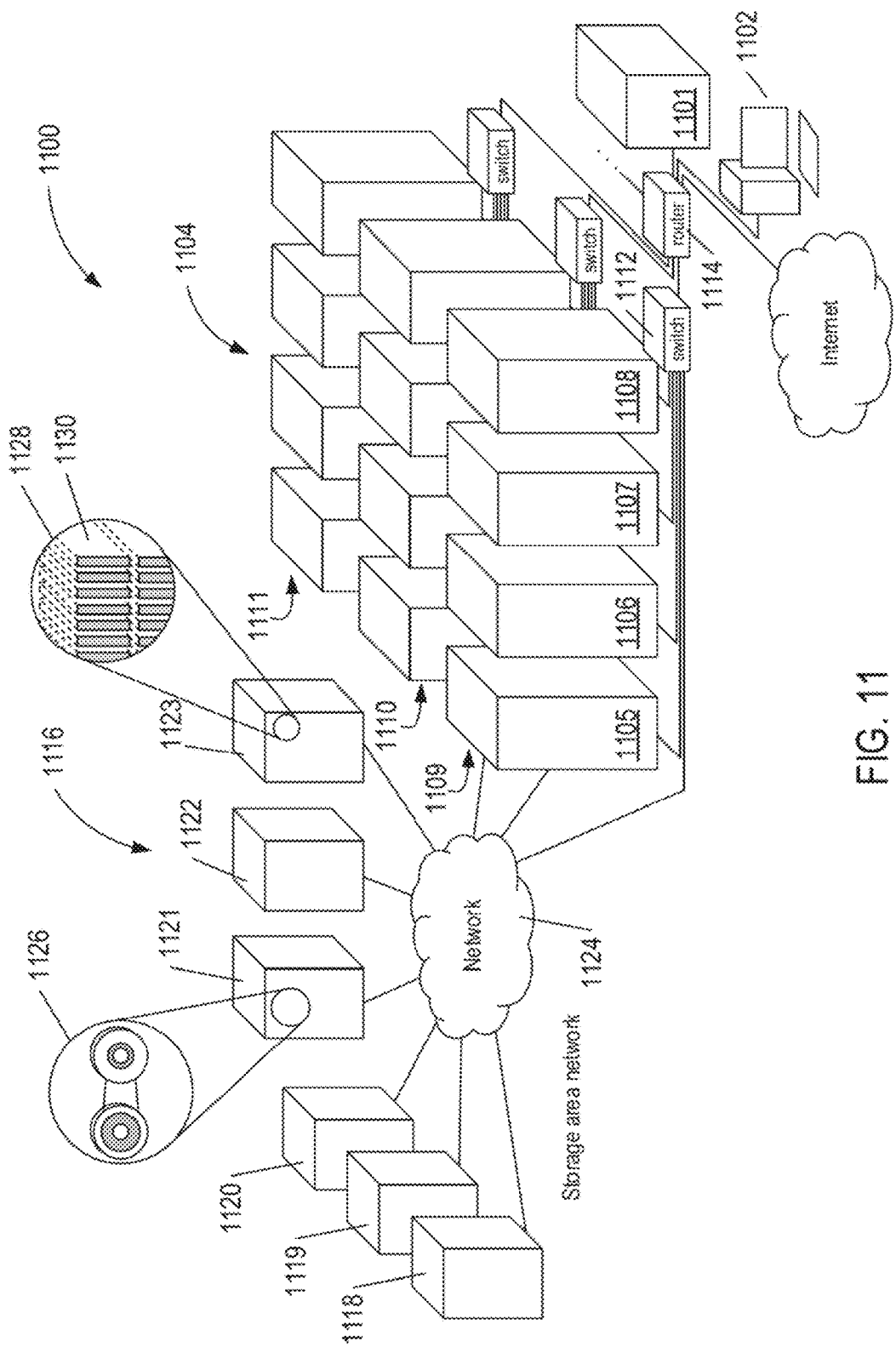
FIG. 11 shows an example of a physical data center.

Methods to Allocate Physical Data-Storage Costs to Logical Disks in a Virtual Data Center FIG. 11 shows an example of a physical data center 1100. The physical data center 1100 consists of a virtual-data-center management server 1101 and a PC 1102 on which a virtual-data-center management interface may be displayed to system administrators and other users. The physical data center 1100 additionally includes a number of hosts or server computers 1104, such as server computers 1105-1108, interconnected to form three local area networks 1109-1111. For example, local area network 1109 includes a switch 1112 that interconnects the four servers 1105-1108 via Ethernet or optical fiber cables. The physical data center 1100 also includes a router 1114 that interconnects the LANs 1109-1111 and interconnects the LANS to the Internet, the virtual-data-center management server 1101, the PC 1102 and to another router (not shown) that, in turn, may be interconnected to other LANs to form a larger network of server computers.

In the example of FIG. 11, the physical data center 1100 includes a storage area network ("SAN") 1116 that stores data generated by the server computers in the physical data center 1100. The SAN 1116 is composed of six storage arrays 1118-1123 that are connected to each of the LANs 1109-1111 via a network 1124. A storage array is a physical storage system composed of a number of physical data-storage devices and other hardware, such as controllers, storage processors, and an enclosure. There are a number of different types of physical data-storage devices, called "disk types," that can be used to form a storage array, including magnetic tape drives, optical disk drives ("ODDs"), solid state drives ("SSDs") (i.e., flash drive), or hard disk drives ("HDDs"). A tape drive is represented in enlarged view 1126 in the storage array 1121, and an enlarged view 1128 reveals an array of drives, such as ODDs, SSDs, or HDDs, in the storage array 1123. A storage array is not limited to having a single disk type to store data. For example, a storage array may use any number ODDs, SSDs, and HDDs.

Disk types are used to form logical groups. A logical group is virtual data storage that may be classified as a RAID (i.e., redundant array of independent disks) group or a storage pool. A RAID group is formed from a single disk type in a storage array. A RAID group provides data redundancy, improved overall performance, and increases storage capacity. For example, a RAID group may be formed using a number of HDDs of a storage array. On the other hand, a storage pool can be provisioned to include any amount of capacity and use any combination of different disk types. For example, a storage pool may be formed from a combination of SSDs and HDDs in a storage array. Storage pools can be configured in varying sizes and provide a number of storage advantages, including performance, management and data protection.

A logical group can be configured as a storage pool with tiered data storage. Tiered data storage is the assignment of different categories of data or data volumes to different disk types in order to reduce total storage cost and time to access or change data. Categories may be based on levels of protection needed, performance requirements, frequency of data usage and changes, and other considerations. Tiers are referred to as Tier 0, Tier 1, Tier 2, and so on with the lower numbers representing a higher performing physical data-storage devices. For example, Tier 0 may be used to store hot data, which is data that is frequently accessed or changed, in a storage array composed of SSDs. By contrast, Tier 2 may be used to store cold data, which is data that is infrequently accessed or changed, in a tape library or recordable optical disks. Tier 1 may be used to store warm data, which is data that is accessed or changed less frequently than hot data but more frequently than cold data, in a storage array composed of HDDs.

Figure 12:
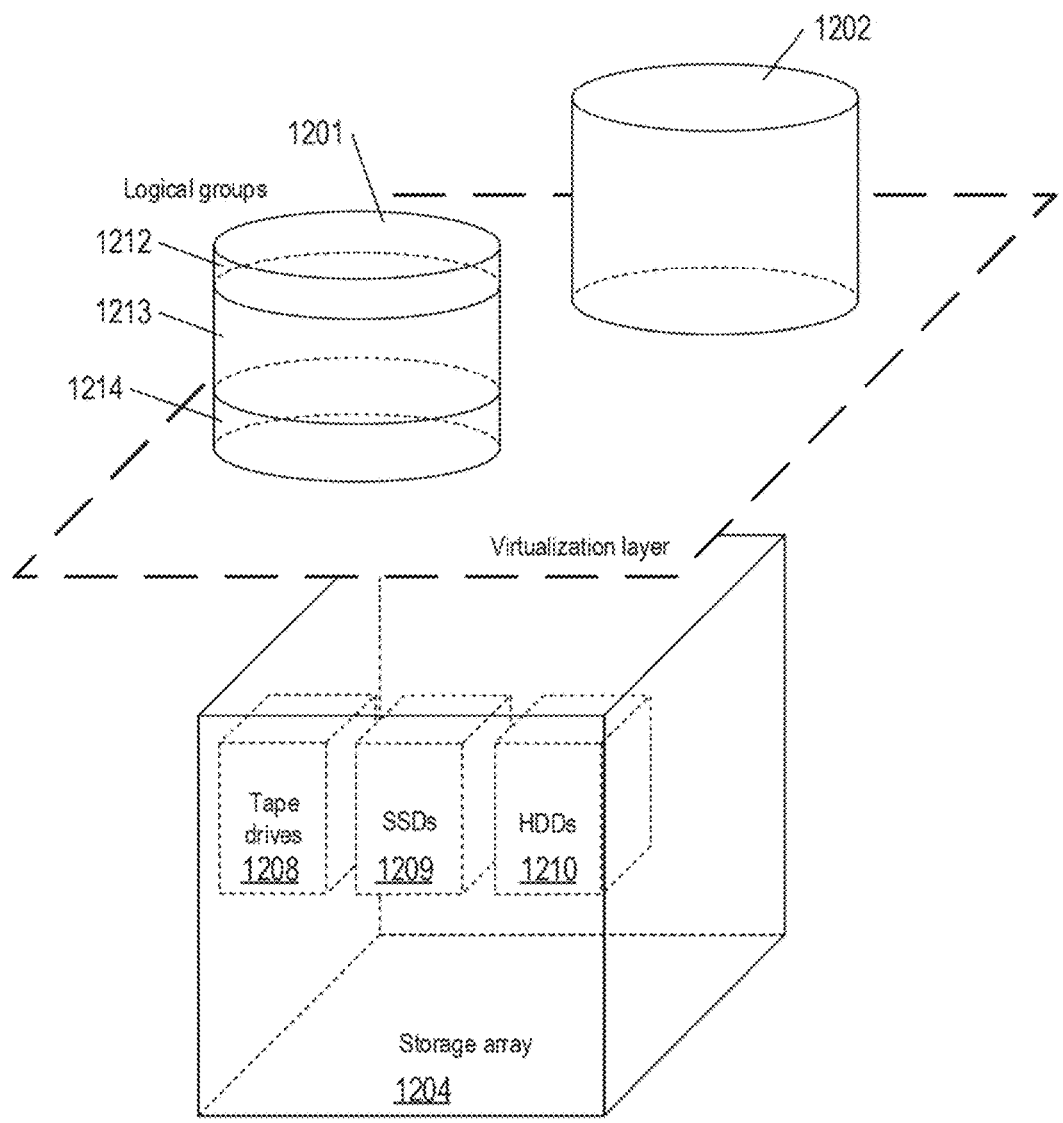
FIG. 12 shows an example of a virtualized storage environment.

FIG. 12 shows an example of a virtualized storage environment composed of two logical groups 1201 and 1202 that interface with a storage array 1204 of a SAN through a virtualization layer 1206. The virtualization layer 1206 provides a hardware-like interface between the logical groups 1201 and 1202 and disk types 1208-1210 of the storage array 1204. The different disk types 1208-1210 are tape drives, SSDs, and HDDs, respectively. The logical group 1201 is a storage pool partitioned into different storage tiers that depend on the different disk types 1208-1210 of the storage array 1204. The logical group 1201 is composed of three storage tiers 1212-1214 that correspond to the different disk types 1208-1210. First storage tier 1212 is composed of SSDs 1209, second storage tier 1213 is composed of HDDs, and third storage tier 1214 is composed of tape drives 1208. The logical group 1202 may be a RAID group formed from one disk type, such as the HDDs 1210.

Each logical group is partitioned into one or more logical disks. A logical disk is a virtual data-storage device that provides usable storage capacity on one storage array. A logical disk is described as virtual because the logical disk does not actually exist as a physical unit, but appears as a physical data-storage device to VMs in a VDC. Because a RAID group is formed using one disk type, the logical disks created out of RAID group are created using only one disk type. On the other hand, logical disk created out of a storage pool can be created from any combination of disk types used to form the storage pool.

Figure 13:
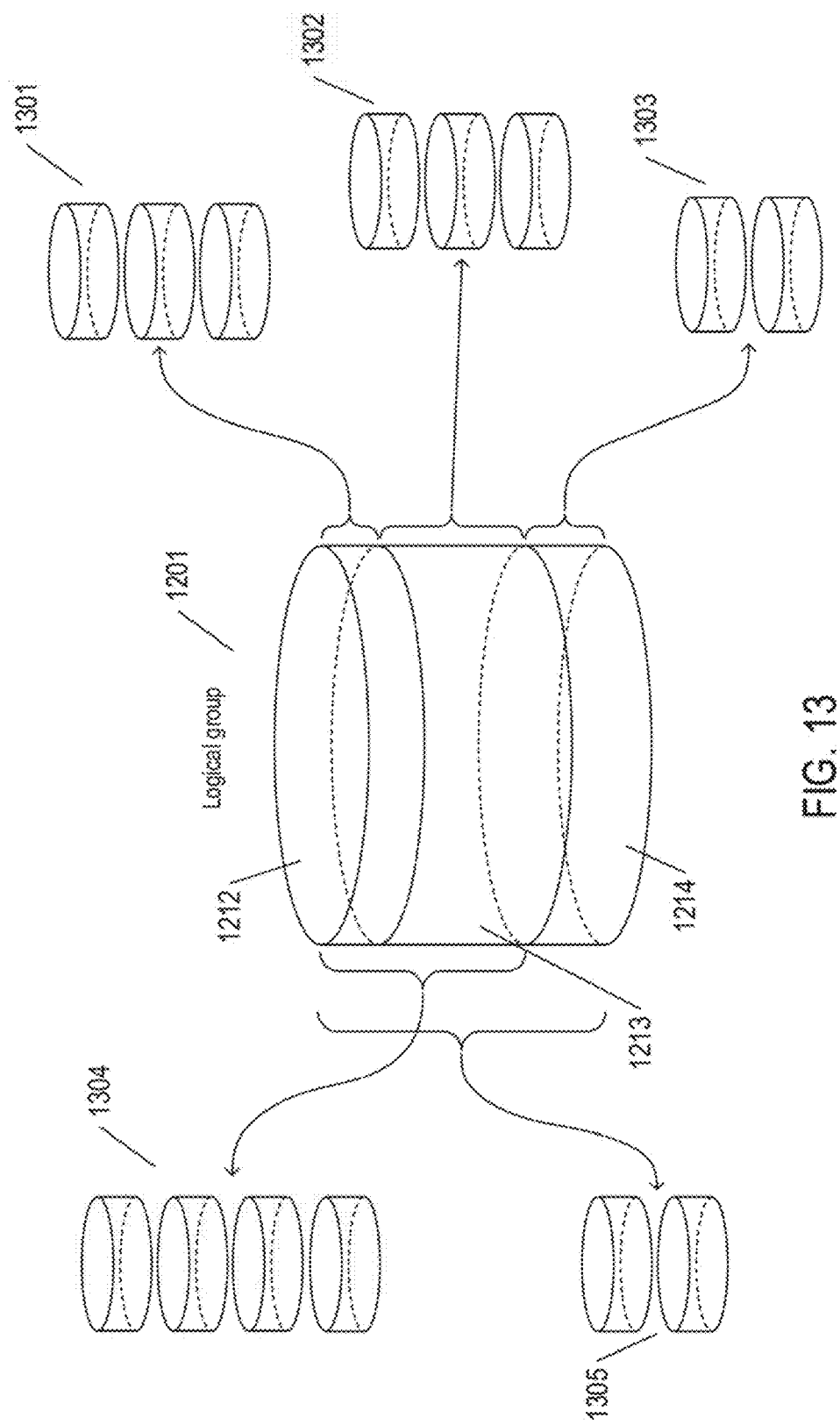
FIG. 13 shows an example of a logical group partitioned into logical disks.

FIG. 13 shows the logical group 1201 partitioned into 15 logical disks. A first set of logical disks 1301 is formed from the disk types (i.e., SSDs) that form the first storage tier 1212. A second set of logical disks 1302 is formed from the disk types (i.e., HDDs) that form the second storage tier 1213. A third set of logical disks 1303 is formed from the disk types (i.e., tape drives) that form the third storage tier 1218. A fourth set of logical disks 1304 is formed from the disk types in the first tier 1212 and the disk types in the second tier 1213. A fifth set of logical disks 1305 is formed from the disk types in all three tiers 1212-1214.

Methods calculate a total capital expenditure of storage in a SAN as follows:

$$C_{Capex} = C_{SH} + C_{SN} \quad (1)$$

where
$C_{SH}$ is cost of storage hardware; and
$C_{SN}$ is cost of storage network.

Storage hardware consists of a range of components depending on the architecture of the storage arrays provided by different data-storage vendors. The components and component configurations may be discovered using storage management software. EMC SRM is storage management software that may be used to retrieve storage array details, array components, and component configurations.

The following table displays an example list of common elements of components and their configurations that contribute to storage hardware cost:

| Component | Configuration factors that contribute to the Cost of a component |
|---|---|
| Storage Processor (Disk Array Controller) | Make and model of the controller, speed and No. of processor cores, No. of ports and protocol of each port |
| Storage Processor Enclosure | Make and model of the controller No. of Storage Processors |
| Disk/Drive | Type, capacity, speed and physical size of disk |
| Disk Array Enclosure ("DAE") | No. of disks, type, size of the disks present inside the DAE |

An extensive storage hardware reference database having costs of different drives and storage array components from different vendors with various configurations is created for a SAN. The reference database is used to compute storage hardware cost. FIG. 14 shows an example of a storage hardware reference database of storage hardware components of a SAN. Column 1401 lists the components, column 1402 list count of each component, and column 1403 list four different component vendors denoted by V1, V2, V3, and V4. Columns 1404-1406 list component configurations, reference cost of each component, and total cost of each component, respectively.

The cost of a storage network, such as the network 1124 in FIG. 11, includes hardware and software services purchased to support storage networking internally and from storage array to server computer. A storage network includes switches and routers; network cards, such as HBA, iSCSI, CNA for FCoE; fiber optic cable, Ethernet cable, and networking software. The cost of a storage network is determined by identifying the components of the storage network and then calculating the cost of each component using a storage network reference database analogous to the storage hardware reference database (See e.g., "Methods and systems to allocate physical network cost to tenants of a data center," patent application Ser. No. 14/600,041, filed Jan. 20, 2015).

Once the cost of each of the storage hardware and network components have been determined, an amortized cost is calculated for each hardware and network component for a payment period of time. The payment period may be daily, weekly, monthly, bimonthly, annually or any agreed upon period of time for paying the principle owed on a component. For example, the amortized cost of a single component may be calculated as follows:

$$C_A = P \frac{R(1+R)^N}{(1+R)^N - 1} \quad (2)$$

where
N is the total number of payment periods;
P is the principle; and
R is the interest rate.

In an alternative implementation, a double-declining depreciation function may be used to calculate the amortized cost of each component. The amortized cost of hardware components in the SAN are summed to obtain the cost of storage hardware components in a single payment period of time as follows:

$$MC_{SH} = \sum_{j=1}^{NH} C_{AH}^j \quad (3)$$

where
NH is the number of hardware components in the SAN; and
$C_{AH}^j$ is the monthly amortized hardware cost of the jth hardware component calculated according to Equation (2).

The amortized cost of storage network components in the SAN are summed to obtain the cost of storage network components in a single payment period of time as follows:

$$MC_{SN} = \sum_{j=1}^{NN} C_{AN}^j \quad (4)$$

where
NN is the number of network components in the SAN; and $C_{AN}^j$ is the monthly amortized network cost of the jth network component calculated according to Equation (2).

A total capital expenditure of physical data storage in a payment period is calculated from the amortized cost of storage hardware components and amortized cost of storage network components as follows:

$$MC_{Capex} = MC_{SH} + MC_{SN} \quad (5)$$

Methods also calculate a total operating expenditure, $C_{Opex}$ that represents the monthly cost of maintaining the SAN. The total operating expenditure, $C_{Opex}$, is calculated as a sum of SAN cost drivers:

$$MC_{Opex} = C_L + C_M + C_F + C_{LB} \quad (6)$$

where
$C_L$ is the software license costs that includes the licenses of the array management applications over the payment period;
$C_M$ is the maintenance cost that includes the storage hardware, storage network, and software maintenance cost of extended warranties over the payment period;
$C_F$ is the facilities cost that includes rental cost for the facility, the power and cooling charges involved in maintaining the physical data-storage devices over the payment period; and
$C_{LB}$ is the labor cost that includes wages of staff who maintain the SAN over the payment period.

A fully loaded cost of the SAN over a payment period is calculated as a sum of the total capital expenditure of physical data storage of Equation (5) and the total operating expenditure of Equation (6) as follows:

$$MC_S = MC_{Capex} + MC_{Opex} \quad (7)$$

Storage resource managers ("SRMs") are applications that manage storage needs across multiple storage arrays. For example, EMC Corporation's ViPR SRM is an example of an SRM that may be used to collect capacity and utilization data for physical data-storage devices, such as the various disk types, and virtual data-storage devices, such as the logical groups and logical disks. In addition, the SRM may also be used to determine the raw capacity, usable capacity of the various physical data-storage devices; usable capacity of each storage array; usable capacity of each logical group; and usable capacity and consumed/used capacity of each logical disk. Raw capacity refers to the storage capacity of a physical data-storage device before the device is dedicated to a RAID group or a storage pool. Usable capacity is a part of the raw capacity that may be used for actual data storage after the physical data-storage device has been dedicated to a RAID group or a storage pool. For example, suppose a storage array is composed of four 100 GB HDDs. The raw storage capacity of the storage array is 400 GB. But, if the storage array is used to form a RAID group in which a portion of the 400 GB is dedicated to storage redundancy, only a fraction of the raw capacity (i.e., usable capacity) is available for data storage depending on the RAID level of the RAID group.

A method of allocating the total storage cost of the SAN, $C_S$, to the logical disks based on each logical disk's utilization of different disk types is now described. The method aggregates the physical data-storage devices in the SAN according to disk type, such as aggregating all tape drives, aggregating all SSDs, and aggregating all HDDs. The method then calculates a total aggregated cost of a disk type as follows:

$$TC_{DiskType} = \sum_{i=0}^{n} DeviceCost_{DiskType}^i \quad (8)$$

where
$DeviceCost_{DiskType}^i$ is the cost of the ith physical data-storage device of a disk type in a payment period.
For example, $TC_{TapeDrives}$ denotes the total aggregated cost of all tape drives in the SAN, and $TC_{SSD}$ denotes the total aggregated cost of all SSDs in the SAN. The total cost of storage in the SAN is given by:

$$TC_{Storage} = \sum_{DiskType} TC_{DiskType} \quad (9)$$

The cost ratio of a disk type in the SAN is given by:

$$Ratio_{DiskType} = \frac{TC_{DiskType}}{TC_{Storage}} \quad (10)$$

A fully loaded cost of a disk type over the period is calculated from the cost ratio of the disk type of Equation (10) and the fully loaded cost of the SAN of Equation (7) as follows:

$$C_{DiskType} = Ratio_{DiskType} \times MC_S \quad (11)$$

For example, $C_{TapeDrives}$ denotes the fully loaded cost of the tape drives, which is the portion of the fully loaded cost of the SAN that is associated with the tape drives, and $C_{SSD}$ denotes the fully loaded cost of the SSDs, which is the portion of the fully loaded cost of the SAN that is associated with the SSDs.

A unit rate (e.g., $/GB) of a disk type is used to allocate the storage cost to virtual data-storage devices, such as the logical groups and logical disks. The unit rate of a disk type is calculated from the usable capacity of the disk type and the fully loaded cost of the disk type. The usable capacity of a disk type is calculated by subtracting any hot spare and vault disk capacities from the total capacity of the disk type, $TCap_{DiskType}$, as follows:

$$UCap_{DiskType} = TCap_{DiskType} - Cap_{HotSpare} - Cap_{VaultDisk} \quad (12)$$

where
$Cap_{HotSpare}$ is the hot spare capacity of the disk type; and
$Cap_{VaultDisk}$ is the vault disk capacity of the disk type.
The hot spare capacity is the storage capacity used when the primary storage capacity of the disk type fails. The vault disk capacity is the capacity of a vault disk used to store operating system data of a storage array. The unit rate of a disk type is given by:

$$U_{DiskType} = \frac{C_{DiskType}}{UCap_{DiskType}} \quad (13)$$

In order to calculate a unit rate of a logical disk, a unit rate of the logical group to which the logical disk belongs is first calculated. The unit rate of a logical group is given by:

$$U_{LG} = \frac{C_{LG}}{UCap_{LG}} \quad (14)$$

where $C_{LG}$ is a total cost of the logical group; and $UCap_{LG}$ is the usable capacity of the logical group.

The total cost of a logical group in Equation (14) is calculated as follows:

$$C_{LG} = \sum_{DiskType \in LG} U_{DiskType} \times LGCap_{DiskType} \qquad (15)$$

where $LGCap_{DiskType}$ is the total raw capacity of a disk type in the logical group determined by the SRM.

For example, a logical group formed from SSDs and HDDs has a total cost given by $$C_{LG} = U_{SSD} \times LGCap_{SSD} + U_{HDD} \times LGCap_{HDD}$$

where $LGCap_{SSD}$ is the total raw capacity of the SSDs used to form the logical group; and $LGCap_{HDD}$ is the total raw capacity of the HDDs used to form the logical group.

The usable capacity of the logical group in Equation (14) may be calculated from the usable capacity of the disk types that form the logical group as follows:

$$UCap_{LG} = \sum_{DiskType \in LG} UCap_{DiskType} \qquad (16)$$

Because a logical disk is carved out of a logical group, the unit rate of a logical disk is the unit rate of the logical group to which the logical disk belongs and is given by $$U_{LD} = U_{LG} \qquad (17)$$

The cost of each logical disk in the logical group is given by:

$$C_{LD} = U_{LD} \times UCap_{LD} \qquad (18)$$

where $UCap_{LD}$ is the usable capacity of the logical disk.

For physical data center administrators, it is important to know how much of the storage capacity of a SAN is used and how much is unused so that the unused storage capacity could be put to better use, which results in more efficient allocation of available data storage in the SAN. Also, knowledge of the cost of unallocated capacities of the logical disks, storage arrays, and the SAN, called "wastage," provides the physical data center administrators an opportunity to adjust usage of the SAN physical data-storage device and storage arrays, and lowers costs.

The unallocated cost of a logical disk:

$$UC_{LD} = (UCap_{LD} - CCap_{LD}) \times U_{LD} \qquad (19)$$

where $UCap_{LD}$ is the usable capacity of a logical disk provided by an SRM; and $CCap_{LD}$ is the actual used capacity of the logical disk.

The cost of unallocated capacity of a logical group is calculated as the sum of the unallocated costs of the logical disks in the logical group and any part of usable capacity of the logical group from which logical disks were not created:

$$UC_{LG} = \sum_{LD \in LG} UC_{LD} \left( UCap_{LG} - \sum_{LD \in LC} UCap_{LD} \right) \times U_{LG} \qquad (20)$$

where $UCap_{LD}$ is the usable capacity of the logical disk in the logical group;

$UC_{LD}$ is the unallocated cost of the logical disk in the logical group; and $UCap_{LG}$ is the usable capacity of the logical group.

The first summation in Equation (20) is the cost of unallocated capacity logical disks in the logical group, and the second summation in Equation (20) is the cost of unused capacity of the logical group.

The cost of unallocated capacity of a logical group may be used as an indicator that the physical data-storage devices used to form the logical group are not efficiently allocated. When $$UC_{LG} > T_{LG} \qquad (21)$$

where $T_{LG}$ is a logical group storage threshold, an alert is generated indicating inefficient usage of the logical group storage.

The cost of unallocated capacity of a storage array is equal to the unallocated costs of the logical groups formed from the storage array and the storage cost of the physical data-storage devices that form the storage array which are part of the storage array but are not included in any logical group:

$$UC_{SA} = \sum_{LG \in SA} UC_{LG} + \sum_{DiskType \in SA} (UCap_{DiskType} - CCap_{DiskType}) \times U_{DiskType} \qquad (22)$$

where $UC_{LG}$ is unallocated cost of a logical group;

$UCap_{DiskType}$ is usable capacity of a disk type; and $CCap_{DiskType}$ is consumed capacity of a disk type.

The first summation in Equation (22) is the cost of unallocated capacities of the logical groups formed on the storage array, and the second summation in Equation (22) is the total cost of logical disks capacities that are not used by the logical groups.

The unallocated cost of a storage array may be used as an indicator that the physical data-storage devices used to form the storage array are not efficiently allocated. When $$UC_{SA} > T_{SA} \qquad (23)$$

where $T_{SA}$ is a storage array storage threshold, an alert is generated indicating inefficient usage of storage in the storage array.

The cost of unallocated capacity of the SAN is calculated as a sum of the cost of unallocated capacities of the storage arrays in the SAN:

$$UC_{SAN} = \sum_{SA \in SAN} UC_{SA} \qquad (24)$$

The magnitude of the unallocated cost of a physical data center may be used as an indicator that the physical data-storage devices used to form the SAN are not efficiently allocated. When $$UC_{SAN} > T_{SAN} \qquad (25)$$

where $T_{SAN}$ is the SAN storage threshold, an alert is generated indicating inefficient usage of storage in the SAN.

Figure 15:
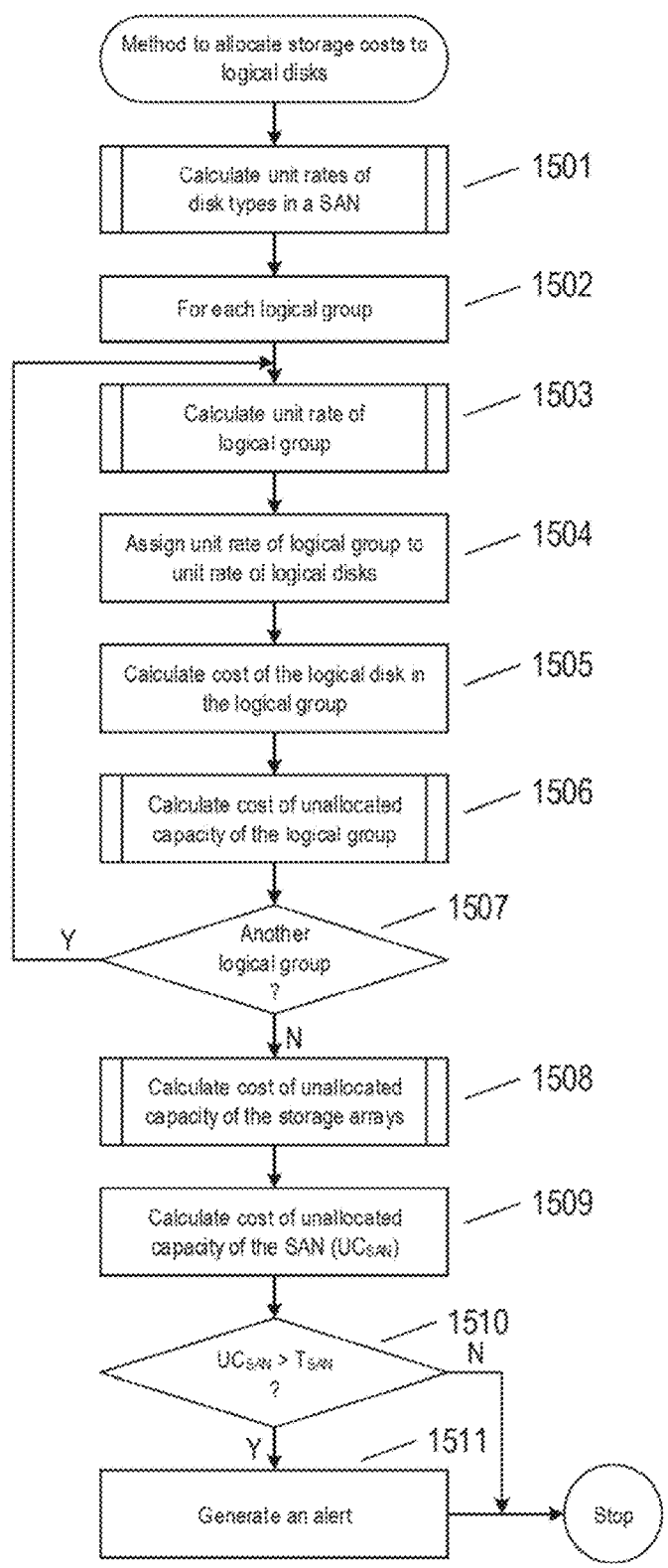
FIG. 15 shows a control-flow diagram of a method to allocate storage costs to logical disks.

FIG. 15 shows a control-flow diagram of a method to allocate storage costs to logical disks. The method may be stored as non-transitory computer readable instructions and executed using a computer, such as the computer shown in FIG. 1. In block 1501, a routine "calculated unit rates of disk types in SAN" is called. A for-loop beginning with block 1502 repeats the operations of blocks 1503-1506 for each logical group. In block 1503, a routine "calculate unit rate of logical group" is called. In block 1504, the unit rate of the logical group is assigned as the unit rate of the logical disks in the logical group, as described above with reference to Equation (17). In block 1505, the cost of the logical disks in the logical group are calculated as described above with reference to Equation (18). In block 1506, a routine "calculate cost of unallocated capacity of the logical group" is called. In decision block 1507, the operations represents by block 1503-1506 are repeated for another logical group. In block 1508, a routine "calculated cost of unallocated capacity of the storage arrays" is called. In block 1509, the cost of unallocated capacities of the storage arrays are summed to obtain the cost unallocated capacity of the SAN. In decision block 1510, when the cost of unallocated capacity of the SAN is greater the SAN storage threshold, control flows to block 1511 in which an alert is generated indicating the SAN is not making efficient use of storage.

Figure 16:
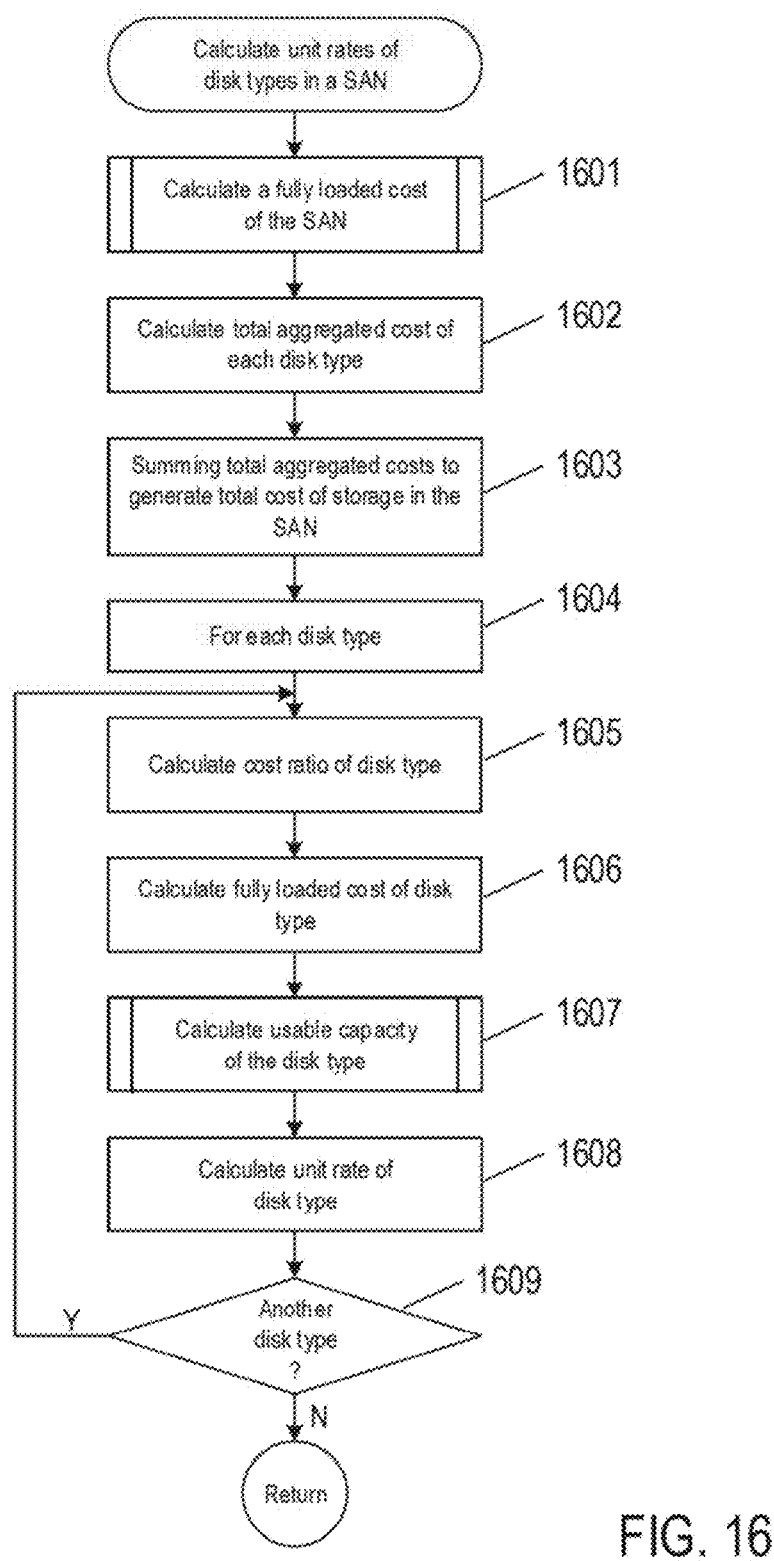
FIG. 16 shows a control-flow diagram of the routine "calculate unit rates of disk types in a SAN" called in FIG. 15.

FIG. 16 shows control-flow diagram of the routine "calculate unit rates of disk types in a SAN" called in block 1501 of FIG. 15. In block 1501, a routine "calculate fully loaded cost of the SAN" is called. In block 1602, a total aggregated cost of each disk type is calculated as described above with reference to Equation (8). In block 1603, the total aggregated costs of the disk types are summed to generate the total cost of storage in the SAN, as described above with reference to Equation (9). A for-loop beginning with block 1604, repeats the operations of block 1605-1608 for each disk type. In block 1605, the cost ratio of the disk type is calculated as described above with reference to Equation (10). In block 1606, the fully loaded cost of the disk type is calculated as described above with reference to Equation (11). In block 1607, a routine "calculate usable capacity of the disk type" is called. In block 1608, the unit rate of the disk type is calculated based on the fully loaded cost of the disk type and the usable capacity of the disk type, as described above with reference to Equation (13). In decision block 1609, the operations represented by blocks 1605-1608 are repeated for another disk type.

Figure 17:
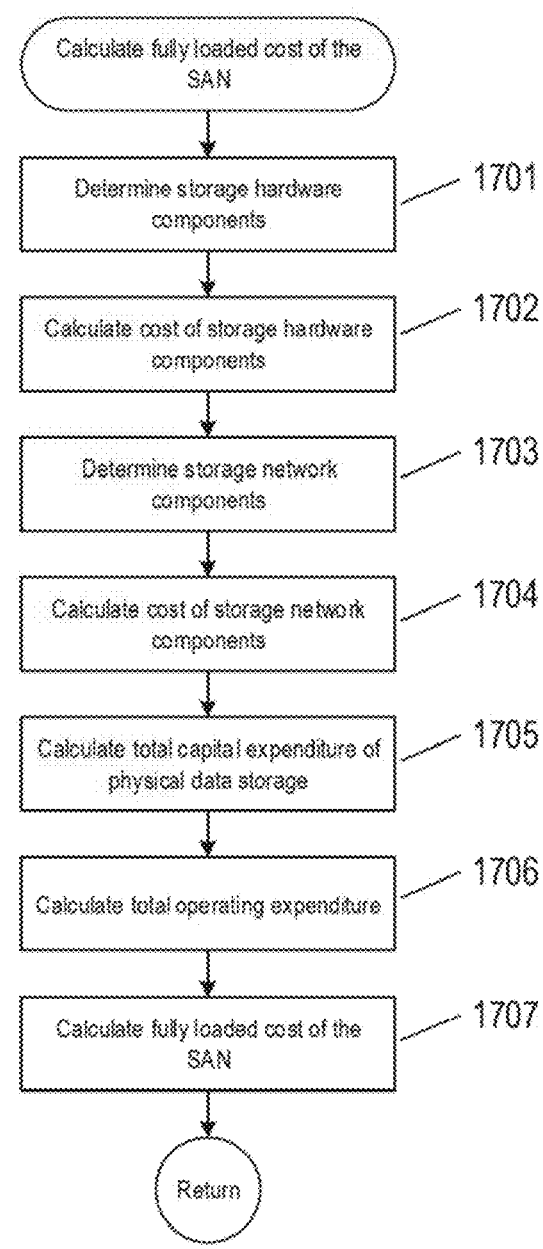
FIG. 17 shows a control-flow diagram of the routine "calculate fully loaded cost of the SAN" called in FIG. 15.

FIG. 17 shows a control-flow diagram of the routine "calculate fully loaded cost of the SAN" called in block 1601 of FIG. 16. In block 1701, the storage hardware components of the SAN are determined by storage management software. In block 1702, the cost of storage hardware components are calculated as described above with reference to Equation (3). In block 1703, the storage network components of the SAN are determined by storage management software. In block 1704, the cost of storage network components is computed as described above with reference to Equation (4). In block 1705, the total capital expenditure of the physical data storage is calculated as described above with reference to Equation (5). In block 1706, the total operating expenditure of maintaining the SAN is calculated as described above with reference to Equation (6). In block 1607, the fully loaded cost of the SAN is calculated as described above with reference to Equation (7).

Figure 18:
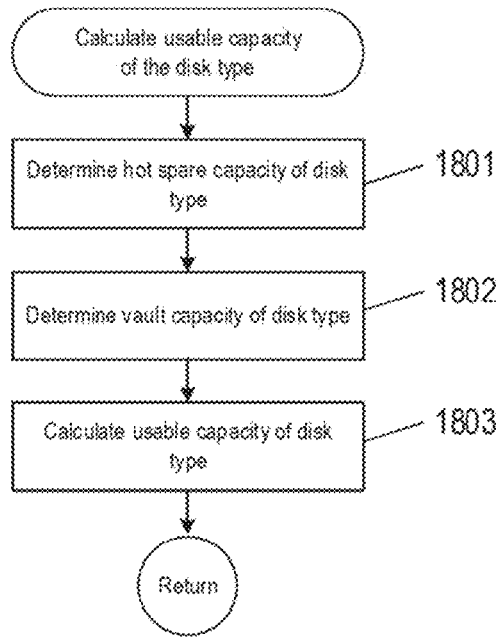
FIG. 18 shows a control-flow diagram of the routine "calculate usable capacity of the disk type" called in FIG. 15.

FIG. 18 shows a control-flow diagram of the routine "calculate usable capacity of the disk type" called in block 1607 of FIG. 16. In blocks 1801 and 1802, the hot spare capacity and vault capacity of the disk type are determined as described above with reference to Equation (12). In block 1803, the usable capacity of the disk type is calculated as described above with reference to Equation (12).

Figure 19:
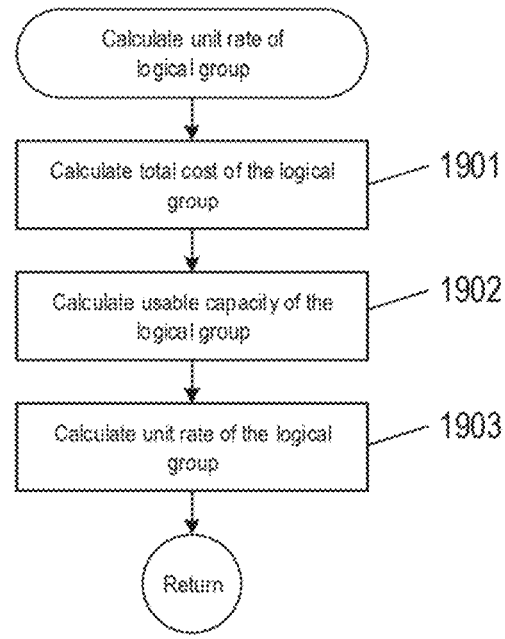
FIG. 19 shows a control-flow diagram of the routine "calculate unit rate of logical group" called in FIG. 15.

FIG. 19 shows a control-flow diagram of the routine "calculate unit rate of logical group" called in block 1507 of FIG. 15. In block 1901, the total cost of the logical group is calculated as described above with reference to Equation (15). In block 1902, the usable capacity of the logical group is calculated as described above with reference to Equation (16). In block 1903, the unit rate of the logical group is calculated as described above with reference to Equation (14).

Figure 20:
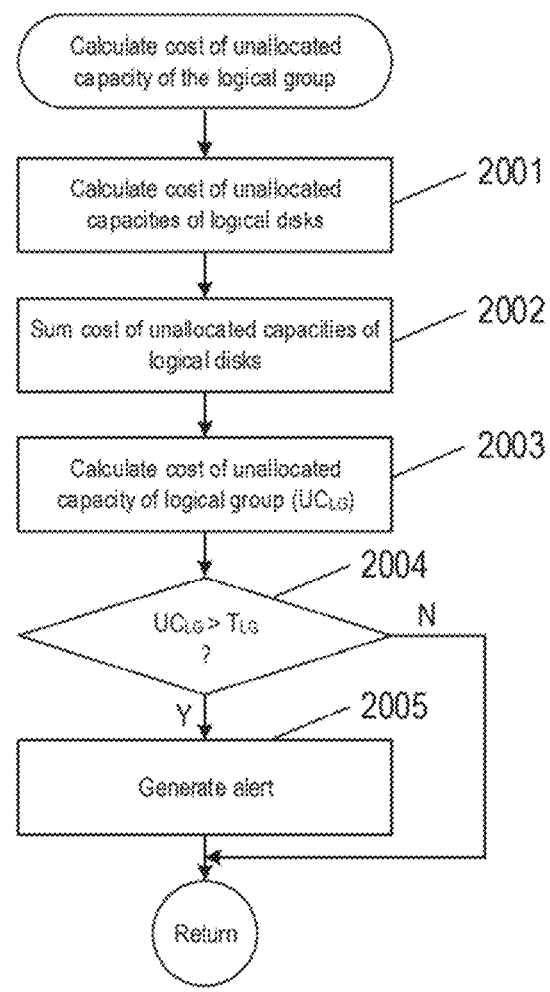
FIG. 20 shows a control-flow diagram of the routine "calculate cost of unallocated capacity of the logical group" called in FIG. 15.

FIG. 20 shows a control-flow diagram of the routine "calculate cost of unallocated capacity of the logical group" called in block 1508 of FIG. 15. In block 2001, the cost of unallocated capacities of logical disks in the logical group are calculated as described above with reference to Equation (19). In block 2002, the cost of unallocated capacities of the logical disks are summed. In block 2003, the cost of unallocated capacity of the logical group is calculated as described above with reference to Equation (20). In decision block 2004, when the unallocated cost of the logical group is greater than the logical group threshold, control flows to block 2005 in which an alert is generated indicating that the storage is inefficiently allocated in the logical group.

Figure 21:
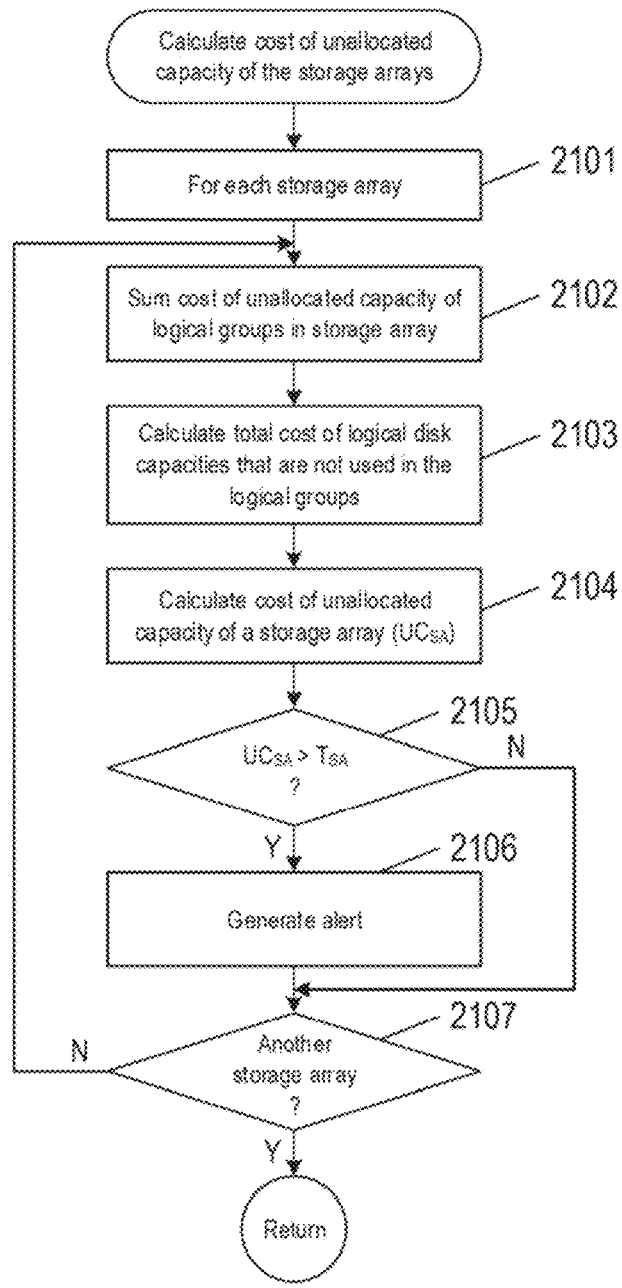
FIG. 21 shows a control-flow diagram of the routine "calculate cost ofunallocated capacity of the storage array" called in FIG. 15.

FIG. 21 shows a control-flow diagram of the routine "calculate cost of unallocated capacity of the storage array" called in block 1513 of FIG. 15. A for-loop beginning with block 2101 repeats the operations represented by blocks 2102-2106 for each storage array. In block 2102, the cost of unallocated capacities of the logical groups in the storage array are summed, as represented by the first summation in Equation (22). In block 2103, a total cost of logical disk capacities that are not used in logical groups are calculated, as represented by the second summation in Equation (22). In block 2104, the cost of unallocated capacity of the storage array is calculated by summing the results of blocks 2102 and 2103, as described above with reference to Equation (22). In decision block 2105, when the cost of unallocated capacity of the storage array is greater than the storage array threshold, control flows to block 2106. In block 2106, an alert is generated indicating that the storage is inefficiently allocated in the storage array.

EXAMPLE

Consider a VNX 8000 storage array with 348,355 GB serial attached SCSI ("SAS") and 15,220 GB flash drives. A single storage pool was created with SAS drive capacity of 340,000 GB and flash drive capacity of 15,000 GB. The usable capacity of the storage pool was 270,000 GB due to RAID and other configurations. For this example, the storage pool was configured with one logical drive having a capacity of 100,000 GB of which 50,000 GB was used. FIG. 22 shows a table of components, configuration, and reference costs of the VNX 8000 storage array. FIG. 23 shows a table hardware and network component costs, capital and operational expenditures, and fully loaded monthly cost of storage for a physical data center that house the VNX 8000. FIG. 24 shows a table capacities, costs, and unit rates calculated for the VNX 8000 storage array based on the data in the tables of FIGS. 22 and 23. FIG. 25 shows a table unallocated cost of storage for the VNX 8000.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

What is claimed is:

1. A method stored in one or more data-storage devices and executed using one or more processors of a computing environment to allocate cost of maintaining and operating a storage area network ("SAN") to logical disks, the method comprising:
    calculating unit rates of disk types in the SAN;
    for each logical group partitioned into one or more logical disks,
        calculating a unit rate of the logical group based on total raw capacities, usable capacities, and the unit rates of the disk types used to form the logical group,
        assigning the unit rate of the logical group to a unit rate of the one or more logical disks,
        calculating a cost of each logical disk in the logical group based on the unit rate of the logical disk and usable capacity of the logical disk, and
        calculating cost of unallocated capacity of the logical group;
    determining wastage of storage arrays in the SAN based on the cost of unallocated capacity of each logical group and the unit rates of the logical disks and logical groups, wherein the wastage of the storage arrays indicates unallocated capacities of the storage arrays which are interfaced with each loeical group; and
    allocating available data storage in the SAN based on the unallocated capacities of the storage arrays.

2. The method of claim 1, wherein calculating the unit rates of disk types in the SAN further comprises:
    calculating a fully loaded cost of the SAN over a payment period;
    calculating a total aggregated cost of each disk type;
    summing the total aggregated cost the disk types to generate a total cost of storage in the SAN; and
    for each disk type of the SAN,
        calculating a cost ratio of the disk type as a ratio of the total aggregated cost of the disk type to the total cost of storage,
        calculating a fully loaded cost of the disk type based on the cost ratio of the disk type and the fully loaded cost of the SAN,
        calculating usable capacity of the disk type, and
        calculating a unit rate of the disk type as a ratio of the fully loaded cost of the disk type and the usable capacity of the disk type.

3. The method of claim 2, wherein calculating the usable capacity of the disk type further comprises:
    determining a hot spare capacity of the disk type;
    determining a vault capacity of the disk type; and
    subtracting the hot spare capacity and vault capacity of the disk type from a total usable storage capacity of the disk type to generate the usable capacity of the disk type.

4. The method claim 1, wherein calculating the unit rate of the logical group further comprises:
    calculating a total cost of the logical group based on the unit rates and total raw capacities of the disk types in the logical group;
    calculating a usable capacity of the logical group as a sum of the usable capacities, of the disk types in the logical group; and
    calculating the rate of the logical group as a ratio of the total cost of the logical group and the usable capacity of the logical group.

5. The method of claim 1, wherein calculating the cost of each logical disk in the logical group further comprises:
    for each logical disk in the logical group, calculating the cost of logical disk as a product of the unit rate of the logical disk and usable capacity of the logical disk.

6. The method of claim 1, wherein calculating the cost of unallocated capacity of the logical group further comprises:
    for each logical group,
        calculating a cost of unallocated capacities of the logical disks in the logical group,
        calculating a cost of unused capacity of the logical group,
        summing the cost of unallocated capacities of the logical disks and the cost of unused capacity of the logical group to generate the cost of unallocated capacity of the logical group, and
        when the cost of unallocated capacity of the logical group is greater than a logical group threshold, generate an alert that indicates inefficient use of logical group storage.

7. The method of claim 1, wherein determining the wastage of the storage arrays in the SAN further comprises:
    for each storage array in the SAN,
        summing the cost of unallocated capacities of the logical groups formed on the storage array,
        calculating a total cost of disk capacities that are not used by the logical groups,
        summing the cost of unallocated capacities of the logical groups formed on the storage array and the total cost of the disk capacities to generate the cost of unallocated capacity of the storage array, and
        when the cost of unallocated capacity of the storage array is greater than a storage array threshold, generating an alert that indicates inefficient use of storage array storage capacity;
    summing the cost of unallocated capacity of the storage arrays to generate a cost of unallocated capacity of the SAN; and
    when the cost of unallocated capacity of the SAN is greater than a SAN storage threshold, generating an alert that indicates inefficient usage storage in the SAN.

8. A system to allocate cost of maintaining and operating a storage area network (SAN) to logical disks ("LDs"), the system comprising:
    one or more processors;
    one or more data-storage devices; and
    machine-readable instructions stored in the one or more data-storage devices that when executed using the one or more processors controls the system to carry out
        calculating unit rates of disk types in the SAN;
        for each logical group partitioned into one or more logical disks,
            calculating a unit rate of the logical group based on total raw capacities, usable capacities, and the unit rates of the disk types used to form the logical group, assigning the unit rate of the logical group to a unit
rate of the one or more logical disks,
calculating a cost of each logical disk in the logical
group based on the unit rate of the logical disk and
usable capacity of the logical disk, and
calculating cost of unallocated capacity of the logical
group;
determining wastage of storage arrays in the SAN
based on the cost of unallocated capacity of each
logical group and the unit rates of the logical disks
and logical groups, wherein the wastage of the
storage arrays indicates unallocated capacities of the
storage arrays which are interfaced with each logical
group; and
allocating available data storage in the SAN based on
the unallocated capacities of the storage arrays.

9. The system of claim 8, wherein calculating the unit rates of disk types in the SAN further comprises:
calculating a fully loaded cost of the SAN over a payment period;
calculating a total aggregated cost of each disk type;
summing the total aggregated cost the disk types to generate a total cost of storage in the SAN; and
for each disk type of the SAN,
calculating a cost ratio of the disk type as a ratio of the total aggregated cost of the disk type to the total cost of storage,
calculating a fully loaded cost of the disk type based on the cost ratio of the disk type and the fully loaded cost of the SAN,
calculating usable capacity of the disk type, and
calculating a unit rate of the disk type as a ratio of the fully loaded cost of the disk type and the usable capacity of the disk type.

10. The system of claim 9, wherein calculating the usable capacity of the disk type further comprises:
determining a hot spare capacity of the disk type;
determining a vault capacity of the disk type; and
subtracting the hot spare capacity and vault capacity of the disk type from a total usable storage capacity of the disk type to generate the usable capacity of the disk type.

11. The system of claim 8, wherein calculating the unit rate of the logical group further comprises:
calculating a total cost of the logical group based on the unit rates and total raw capacities of the disk types in the logical group;
calculating a usable capacity of the logical group as a sum of the usable capacities of the disk types in the logical group; and
calculating the rate of the logical group as a ratio of the total cost of the logical group and the usable capacity of the logical group.

12. The system of claim 8, wherein calculating the cost of each logical disk in the logical group further comprises:
for each logical disk in the logical group, calculating the cost of logical disk as a product of the unit rate of the logical disk and usable capacity of the logical disk.

13. The system of claim 8, wherein calculating the cost of unallocated capacity of the logical group further comprises:
for each logical group,
calculating a cost of unallocated capacities of the logical disks in the logical group,
calculating a cost of unused capacity of the logical group,
summing the cost of unallocated capacities of the logical disks and the cost of unused capacity of the logical group to generate the cost of unallocated capacity of the logical group, and
when the cost of unallocated capacity of the logical group is greater than a logical group threshold, generate an alert that indicates inefficient use of logical group storage.

14. The system of claim 8, wherein determining the wastage of the storage arrays in the SAN further comprises:
for each storage array in the SAN,
summing the cost of unallocated capacities of the logical groups formed on the storage array,
calculating a total cost of disk capacities that are not used by the logical groups,
summing the cost of unallocated capacities of the logical groups formed on the storage array and the total cost of the disk capacities to generate the cost of unallocated capacity of the storage array, and
when the cost of unallocated capacity of the storage array is greater than a storage array threshold, generating an alert that indicates inefficient use of storage array storage capacity;
summing the cost of unallocated capacity of the storage arrays to generate a cost of unallocated capacity of the SAN; and
when the cost of unallocated capacity of the SAN is greater than a SAN storage threshold, generating an alert that indicates inefficient usage storage in the SAN.

15. A non-transitory computer-readable medium encoded with machine-readable instructions that implement a method carried out by one or more processors of a computer system to perform the operations of
calculating unit rates of disk types in a storage area network (SAN);
for each logical group partitioned into one or more logical disks,
calculating a unit rate of the logical group based on total raw capacities, usable capacities, and the unit rates of the disk types used to form the logical group,
assigning the unit rate of the logical group to a unit rate of the one or more logical disks,
calculating a cost of each logical disk in the logical group based on the unit rate of the logical disk and usable capacity of the logical disk,
calculating cost of unallocated capacity of the logical group;
determining wastage of storage arrays in the SAN based on the cost of unallocated capacity of each logical group and the unit rates of the logical disks and logical groups, wherein the wastage of the storage arrays indicates unallocated capacities of the storage arrays which are interfaced with each logical group; and
allocating available data storage in the SAN based on the unallocated capacities of the storage arrays.

16. The medium of claim 15, wherein calculating the unit rates of disk types in the SAN further comprises:
calculating a fully loaded cost of the SAN over a payment period;
calculating a total aggregated cost of each disk type;
summing the total aggregated cost the disk types to generate a total cost of storage in the SAN; and
for each disk type of the SAN,
calculating a cost ratio of the disk type as a ratio of the total aggregated cost of the disk type to the total cost of storage, calculating a fully loaded cost of the disk type based on the cost ratio of the disk type and the fully loaded cost of the SAN, calculating usable capacity of the disk type, and calculating a unit rate of the disk type as a ratio of the fully loaded cost of the disk type and the usable capacity of the disk type.

17. The medium of claim 16, wherein calculating the usable capacity of the disk type further comprises:

determining a hot spare capacity of the disk type;

determining a vault capacity of the disk type; and subtracting the hot spare capacity and vault capacity of the disk type from a total usable storage capacity of the disk type to generate the usable capacity of the disk type.

18. The medium of claim 15, wherein calculating the unit rate of the logical group further comprises:

calculating a total cost of the logical group based on the unit rates and total raw capacities of the disk types in the logical group;

calculating a usable capacity of the logical group as a sum of the usable capacities of the disk types in the logical group; and calculating the rate of the logical group as a ratio of the total cost of the logical group and the usable capacity of the logical group.

19. The medium of claim 15, wherein calculating the cost of each logical disk in the logical group further comprises:

for each logical disk in the logical group, calculating the cost of logical disk as a product of the unit rate of the logical disk and usable capacity of the logical disk.

20. The medium of claim 15, wherein calculating the cost of unallocated capacity of the logical group further comprises:

for each logical group, calculating a cost of unallocated capacities of the logical disks in the logical group, calculating a cost of unused capacity of the logical group, summing the cost of unallocated capacities of the logical disks and the cost of unused capacity of the logical group to generate the cost of unallocated capacity of the logical group, and when the cost of unallocated capacity of the logical group is greater than a logical group threshold, generate an alert that indicates inefficient use of logical group storage.

21. The medium of claim 15, wherein determining the wastage of the storage arrays in the SAN further comprises:

for each storage array in the SAN, summing the cost of unallocated capacities of the logical groups formed on the storage array, calculating a total cost of disk capacities that are not used by the logical groups, summing the cost of unallocated capacities of the logical groups formed on the storage array and the total cost of the disk capacities to generate the cost of unallocated capacity of the storage array, and when the cost of unallocated capacity of the storage array is greater than a storage array threshold, generating an alert that indicates inefficient use of storage array storage capacity;

summing the cost of unallocated capacity of the storage arrays to generate a cost of unallocated capacity of the SAN; and when the cost of unallocated capacity of the SAN is greater than a SAN storage threshold, generating an alert that indicates inefficient usage storage in the SAN.

* * * * *